US011422986B1

(12) United States Patent
Waas et al.

(10) Patent No.: US 11,422,986 B1
(45) Date of Patent: Aug. 23, 2022

(54) ONE-CLICK DATABASE MIGRATION WITH AUTOMATIC SELECTION OF A DATABASE

(71) Applicant: Datometry, Inc., San Francisco, CA (US)

(72) Inventors: Florian Michael Waas, San Francisco, CA (US); Dmitri Korablev, San Francisco, CA (US); Mohamed Soliman, Foster City, CA (US); Lyublena Rosenova Antova, Sunnyvale, CA (US); Michael Alexander Duller, San Francisco, CA (US); Mark Morcos, Oakland, CA (US); Marc Sugiyama, San Francisco, CA (US); Michele Gage, San Francisco, CA (US)

(73) Assignee: DATOMETRY, INC., San Francisco, CA (US)

( * ) Notice: Subject to any disclaimer, the term of this patent is extended or adjusted under 35 U.S.C. 154(b) by 84 days.

(21) Appl. No.: 16/684,803

(22) Filed: Nov. 15, 2019

Related U.S. Application Data

(60) Provisional application No. 62/915,585, filed on Oct. 15, 2019, provisional application No. 62/890,572, (Continued)

(51) Int. Cl.
*G06F 16/00* (2019.01)
*G06F 16/21* (2019.01)
(Continued)

(52) U.S. Cl.
CPC .......... *G06F 16/214* (2019.01); *G06F 3/0484* (2013.01); *G06F 16/2452* (2019.01); *G06F 16/256* (2019.01); *G06F 16/258* (2019.01)

(58) Field of Classification Search
CPC .. G06F 16/214; G06F 16/2452; G06F 16/256; G06F 16/258; G06F 3/0484
See application file for complete search history.

(56) References Cited

U.S. PATENT DOCUMENTS 5,970,490 A    10/1999  Morgenstern
6,108,649 A *   8/2000  Young .................... G06F 16/10
(Continued)

FOREIGN PATENT DOCUMENTS

CN            107122361 A        9/2017
WO      WO-2007121571 A1 *  11/2007  ......... H04L 41/0853

OTHER PUBLICATIONS

Aleyasen, A., et al., "High-Throughput Adaptive Data Virtualization via Context-Aware Query Routing," 2018 IEEE International Conference on Big Data, Dec. 10-13, 2018, 10 pages, Seattle, WA, USA.
(Continued)

*Primary Examiner* — Diedra McQuitery
(74) *Attorney, Agent, or Firm* — Adeli LLP

(57) ABSTRACT

Some embodiments provide a method for migrating a set of data objects from a first database of a first database type to a second database of a second database type. The method retrieves a particular set of data from the first database and performs an automated process to analyze the particular set of data in order to select the second database type from multiple other database types. The method presents on a display the selected second database type and a user interface control for migrating the set of data objects stored in the first database to the second database of the second database type. In response to a selection of the user interface control, the method provisions the second database and transfers the set of data objects from the first database to the second database.

19 Claims, 14 Drawing Sheets

Related U.S. Application Data filed on Aug. 22, 2019, provisional application No. 62/859,693, filed on Jun. 10, 2019, provisional application No. 62/859,695, filed on Jun. 10, 2019, provisional application No. 62/824,994, filed on Mar. 27, 2019, provisional application No. 62/817,533, filed on Mar. 12, 2019, provisional application No. 62/782,337, filed on Dec. 19, 2018.

(51) Int. Cl.
*G06F 3/0484* (2022.01)
*G06F 16/25* (2019.01)
*G06F 16/2452* (2019.01)

(56) References Cited

U.S. PATENT DOCUMENTS

| | | |
|---|---|---|
| 6,704,747 B1 | 3/2004 | Fong |
| 6,889,227 B1 | 5/2005 | Hamilton |
| 7,123,608 B1 | 10/2006 | Scott et al. |
| 7,146,376 B2 | 12/2006 | Dettinger et al. |
| 7,203,678 B1 | 4/2007 | Petropoulos et al. |
| 7,263,590 B1 | 8/2007 | Todd et al. |
| 7,346,635 B2 * | 3/2008 | Whitten ............... G06F 16/214 |
| 7,359,916 B2 | 4/2008 | Werner |
| 7,480,661 B2 | 1/2009 | Seefeldt et al. |
| 7,620,665 B1 | 11/2009 | George et al. |
| 7,664,795 B2 | 2/2010 | Balin et al. |
| 7,693,913 B2 | 4/2010 | Goto |
| 7,805,583 B1 * | 9/2010 | Todd ....................... G06F 3/067 |
| | | 711/162 |
| 7,877,397 B2 | 1/2011 | Nagarajan et al. |
| 7,885,968 B1 | 2/2011 | Hamamatsu et al. |
| 7,904,487 B2 | 3/2011 | Ghatare |
| 8,015,233 B2 | 9/2011 | Li et al. |
| 3,250,027 A1 | 8/2012 | Fujiyama et al. |
| 8,275,810 B2 | 9/2012 | Barton |
| 8,429,601 B2 | 4/2013 | Andersen |
| 8,447,774 B1 | 5/2013 | Robie et al. |
| 8,533,177 B2 | 9/2013 | Huck et al. |
| 8,612,468 B2 | 12/2013 | Schloming |
| 8,631,034 B1 | 1/2014 | Peloski |
| 8,793,797 B2 | 7/2014 | Meenakshisundaram |
| 8,874,609 B1 | 10/2014 | Singh et al. |
| 8,898,126 B1 | 11/2014 | Dai |
| 8,918,416 B1 | 12/2014 | Gross et al. |
| 8,943,181 B2 | 1/2015 | Kasten et al. |
| 8,972,433 B2 | 3/2015 | McLean et al. |
| 8,996,555 B2 | 3/2015 | Kuchmann-Beauger et al. |
| 9,075,811 B2 | 7/2015 | Nayyar et al. |
| 9,158,827 B1 | 10/2015 | Vu et al. |
| 9,201,606 B1 | 12/2015 | Taylor et al. |
| 9,208,032 B1 | 12/2015 | McAlister et al. |
| 9,305,070 B2 | 4/2016 | Zhu et al. |
| 9,582,539 B1 | 2/2017 | Cole et al. |
| 9,639,572 B2 | 5/2017 | Hutzel et al. |
| 9,665,619 B1 | 5/2017 | Cole et al. |
| 9,697,484 B1 | 7/2017 | Mohen et al. |
| 9,785,645 B1 | 10/2017 | Chen et al. |
| 9,811,527 B1 * | 11/2017 | Esposito ............... G06F 16/119 |
| 10,108,914 B2 | 10/2018 | Mohen et al. |
| 10,120,920 B2 | 11/2018 | Alva et al. |
| 10,162,729 B1 | 12/2018 | Snyder et al. |
| 10,241,960 B2 | 3/2019 | Kent, IV et al. |
| 10,255,336 B2 | 4/2019 | Waas et al. |
| 10,261,956 B2 | 4/2019 | Jugel et al. |
| 10,445,334 B1 | 10/2019 | Xiao et al. |
| 10,585,887 B2 | 3/2020 | Tran et al. |
| 10,594,779 B2 | 3/2020 | Waas et al. |
| 10,599,664 B2 | 3/2020 | Agrawal et al. |
| 10,614,048 B2 | 4/2020 | Fuglsang et al. |
| 10,628,438 B2 | 4/2020 | Waas et al. |
| 10,649,965 B2 | 5/2020 | Barbas et al. |
| 10,649,989 B2 | 5/2020 | Lereya et al. |
| 10,762,100 B2 | 9/2020 | Waas et al. |
| 10,762,435 B2 | 9/2020 | Yang et al. |
| 10,769,200 B1 | 9/2020 | Lin |
| 10,783,124 B2 | 9/2020 | Barbas et al. |
| 10,824,641 B1 | 11/2020 | Plenderleith |
| 10,846,284 B1 | 11/2020 | Park et al. |
| 11,016,954 B1 | 5/2021 | Babocichin et al. |
| 11,204,898 B1 | 12/2021 | Waas et al. |
| 2001/0034733 A1 | 10/2001 | Prompt et al. |
| 2002/0087587 A1 | 7/2002 | Vos et al. |
| 2002/0133504 A1 | 9/2002 | Vlahos et al. |
| 2002/0161907 A1 | 10/2002 | Moon |
| 2003/0126156 A1 | 7/2003 | Stoltenberg et al. |
| 2003/0184793 A1 | 10/2003 | Pineau |
| 2004/0122953 A1 | 6/2004 | Kalmuk et al. |
| 2004/0139061 A1 | 7/2004 | Colossi et al. |
| 2004/0215629 A1 | 10/2004 | Dettinger et al. |
| 2005/0038781 A1 | 2/2005 | Ferrari et al. |
| 2005/0080914 A1 | 4/2005 | Lerner et al. |
| 2005/0234889 A1 | 10/2005 | Fox et al. |
| 2006/0026179 A1 | 2/2006 | Brown et al. |
| 2006/0136448 A1 | 6/2006 | Cialini et al. |
| 2006/0167896 A1 | 7/2006 | Kapur et al. |
| 2006/0242297 A1 | 10/2006 | Aronoff et al. |
| 2007/0027905 A1 | 2/2007 | Warren et al. |
| 2007/0061266 A1 | 3/2007 | Moore et al. |
| 2007/0136311 A1 | 6/2007 | Kasten et al. |
| 2007/0219959 A1 | 9/2007 | Kanemasa |
| 2007/0239774 A1 | 10/2007 | Bodily et al. |
| 2007/0283144 A1 | 12/2007 | Kramer et al. |
| 2008/0281784 A1 | 11/2008 | Zane et al. |
| 2009/0024622 A1 | 1/2009 | Chkodrov et al. |
| 2009/0059785 A1 | 3/2009 | Jogalekar et al. |
| 2009/0132503 A1 | 5/2009 | Sun et al. |
| 2009/0150367 A1 | 6/2009 | Melnik et al. |
| 2009/0240711 A1 * | 9/2009 | Levin .................... G06F 16/217 |
| 2009/0319498 A1 | 12/2009 | Zabokritski et al. |
| 2010/0023481 A1 | 1/2010 | McGoveran |
| 2010/0082646 A1 | 4/2010 | Meek et al. |
| 2010/0094838 A1 | 4/2010 | Kozak |
| 2010/0169377 A1 | 7/2010 | Galeazzi et al. |
| 2010/0169381 A1 | 7/2010 | Faunce et al. |
| 2011/0010379 A1 | 1/2011 | Gilderman et al. |
| 2011/0055231 A1 | 3/2011 | Huck et al. |
| 2011/0154461 A1 | 6/2011 | Anderson et al. |
| 2011/0191343 A1 | 8/2011 | Heaton et al. |
| 2011/0276623 A1 | 11/2011 | Girbal |
| 2011/0320444 A1 | 12/2011 | Yehaskel et al. |
| 2012/0005148 A1 | 1/2012 | Horvitz et al. |
| 2012/0036146 A1 | 2/2012 | Annapragada |
| 2012/0102022 A1 | 4/2012 | Miranker et al. |
| 2012/0131567 A1 | 5/2012 | Barros et al. |
| 2012/0158650 A1 | 6/2012 | Andre et al. |
| 2012/0179677 A1 | 7/2012 | Roselli et al. |
| 2012/0221817 A1 | 8/2012 | Yueh |
| 2012/0296942 A1 | 11/2012 | Arora et al. |
| 2012/0303913 A1 * | 11/2012 | Kathmann ............ G06F 3/0689 |
| | | 711/162 |
| 2012/0304179 A1 | 11/2012 | Devarakonda et al. |
| 2013/0066948 A1 | 3/2013 | Colrain et al. |
| 2013/0085989 A1 | 4/2013 | Nayyar et al. |
| 2013/0163737 A1 | 6/2013 | Dement et al. |
| 2013/0179476 A1 | 7/2013 | Saam et al. |
| 2013/0262425 A1 | 10/2013 | Shamlin et al. |
| 2013/0311729 A1 | 11/2013 | Navarro et al. |
| 2013/0325927 A1 | 12/2013 | Corbett et al. |
| 2014/0095534 A1 | 4/2014 | Aingaran et al. |
| 2014/0136516 A1 | 5/2014 | Clifford et al. |
| 2014/0143011 A1 | 5/2014 | Mudugu et al. |
| 2014/0195514 A1 | 7/2014 | Stein |
| 2014/0244610 A1 | 8/2014 | Raman et al. |
| 2014/0280286 A1 | 9/2014 | Ganti et al. |
| 2014/0325096 A1 | 10/2014 | Jung et al. |
| 2014/0359129 A1 | 12/2014 | Sharma et al. |
| 2015/0019488 A1 * | 1/2015 | Higginson ............ G06F 16/214 |
| | | 707/634 |
| 2015/0095381 A1 | 4/2015 | Chen et al. |
| 2015/0172206 A1 | 6/2015 | Anderson et al. |
| 2015/0248404 A1 | 9/2015 | Pazdziora et al. |
| 2015/0269223 A1 | 9/2015 | Miranker et al. |

(56) References Cited

U.S. PATENT DOCUMENTS

| | | |
|---|---|---|
| 2015/0310057 A1 | 10/2015 | Fu et al. |
| 2015/0339361 A1 | 11/2015 | Kumar et al. |
| 2015/0347585 A1 | 12/2015 | Klotz |
| 2015/0363396 A1 | 12/2015 | Sengupta et al. |
| 2016/0127325 A1 | 5/2016 | Odenheimer et al. |
| 2016/0188710 A1 | 6/2016 | Naik |
| 2016/0261576 A1 | 9/2016 | Nivala et al. |
| 2016/0292164 A1 | 10/2016 | Kedia et al. |
| 2016/0292167 A1 | 10/2016 | Tran et al. |
| 2016/0308941 A1 | 10/2016 | Cooley |
| 2016/0321097 A1 | 11/2016 | Zhu et al. |
| 2016/0328442 A1 | 11/2016 | Waas et al. |
| 2016/0335361 A1 | 11/2016 | Teodorescu et al. |
| 2017/0011104 A1 | 1/2017 | Hyde et al. |
| 2017/0017685 A1 | 1/2017 | Das et al. |
| 2017/0034095 A1 | 2/2017 | Kamalakantha et al. |
| 2017/0063936 A1 | 3/2017 | Waas et al. |
| 2017/0116207 A1 | 4/2017 | Lee et al. |
| 2017/0116249 A1 | 4/2017 | Ravipati et al. |
| 2017/0116260 A1 | 4/2017 | Chattopadhyay |
| 2017/0116274 A1 | 4/2017 | Weissman et al. |
| 2017/0116298 A1 | 4/2017 | Ravipati et al. |
| 2017/0124146 A1 | 5/2017 | Lereya et al. |
| 2017/0147656 A1 | 5/2017 | Choudhary et al. |
| 2017/0177650 A1 | 6/2017 | Devine et al. |
| 2017/0235790 A1 | 8/2017 | Bruso et al. |
| 2017/0249353 A1 | 8/2017 | Gulik et al. |
| 2017/0262777 A1 | 9/2017 | Mohen et al. |
| 2018/0081946 A1 | 3/2018 | Bondalapati et al. |
| 2018/0121433 A1 | 5/2018 | Nevrekar et al. |
| 2018/0144001 A1 | 5/2018 | Lai et al. |
| 2018/0150361 A1 | 5/2018 | Khandelwal |
| 2018/0173775 A1 | 6/2018 | Li et al. |
| 2018/0218030 A1 | 8/2018 | Wong et al. |
| 2018/0234327 A1 | 8/2018 | Kono |
| 2018/0246886 A1* | 8/2018 | Dragomirescu ...... G06F 16/214 |
| 2018/0285475 A1 | 10/2018 | Grover et al. |
| 2018/0292995 A1 | 10/2018 | Tai et al. |
| 2018/0329916 A1 | 11/2018 | Waas et al. |
| 2018/0336258 A1 | 11/2018 | Lee et al. |
| 2018/0357291 A1 | 12/2018 | Choi et al. |
| 2019/0065536 A1 | 2/2019 | Becker et al. |
| 2019/0095241 A1 | 3/2019 | Ago et al. |
| 2019/0138402 A1 | 5/2019 | Bikumala et al. |
| 2019/0155805 A1 | 5/2019 | Kent, IV et al. |
| 2019/0294763 A1 | 9/2019 | Coatrieux et al. |
| 2019/0303379 A1 | 10/2019 | Waas et al. |
| 2019/0311057 A1 | 10/2019 | Sung et al. |
| 2019/0327154 A1 | 10/2019 | Sahoo et al. |
| 2019/0392067 A1 | 12/2019 | Sonawane et al. |
| 2020/0104375 A1 | 4/2020 | Earnesty, Jr. et al. |
| 2020/0104376 A1 | 4/2020 | Earnesty, Jr. et al. |
| 2020/0104377 A1* | 4/2020 | Earnesty, Jr .......... G06F 9/4843 |
| 2020/0125582 A1 | 4/2020 | O'Shaughnessy |
| 2020/0167323 A1 | 5/2020 | Swamy et al. |
| 2020/0169600 A1 | 5/2020 | Waas et al. |
| 2020/0183929 A1 | 6/2020 | Lee et al. |
| 2020/0201860 A1 | 6/2020 | Vogelsgesang et al. |
| 2020/0250179 A1 | 8/2020 | Agrawal et al. |
| 2020/0278966 A1 | 9/2020 | Al-Omari et al. |
| 2021/0034636 A1 | 2/2021 | Waas et al. |

OTHER PUBLICATIONS

Antova, Lyublena, et al., "Datometry Hyper-Q: Bridging the Gap Between Real-Time and Historical Analytics," SIGMOD'16, Jun. 26-Jul. 1, 2016, 12 pages, ACM, San Francisco, CA, USA.

Author Unknown, "AWS Database Migration Service," Month Unknown, 2017, 8 pages, Amazon Web Services, Inc., retrieved from https://aws.amazon.com/dms/.

Author Unknown, "DBBest Technologies," Month Unknown, 2017, 3 pages, DB Best Technologies, LLC, retrieved from https://www.dbbest.com/.

Author Unknown, "Ispirer," Month Unknown, 2017, 5 pages, Ispirer Systems, LLC, retrieved from https://www.ispirer.com/.

Author Unknown, "Linked Servers (Database Engine)," Oct. 14, 2019, 5 pages, Microsoft, retrieved from https://docs.microsoft.com/en-us/sql/relational-databases/linked-servers/linked-servers-database-engine?view=sql-server-ver15.

Author Unknown, "Teradata Data Warehouse—End of Useful Life," Case Study, Month Unknown 2018, 2 pages, Datometry, Inc., retrieved from https://datometry.com/resources/case-studies/replatform-teradata-end-of-useful-life-replatforming-to-cloud/.

Gupta, Anurag, et al., "Amazon Redshift and the Case for Simpler Data Warehouses," SIGMOD'15, May 31, 2015-Jun. 4, 2015, 7 pages, ACM, Melbourne, Victoria, Australia.

Non-Published Commonly Owned U.S. Appl. No. 16/684,785, filed Nov. 15, 2019, 54 pages, Datometry, Inc.

Non-Published Commonly Owned U.S. Appl. No. 16/684,847, filed Nov. 15, 2019, 54 pages, Datometry, Inc.

Simitsis, Alkis, et al., "Optimizing Analytic Data Flows for Multiple Execution Engines," SIGMOD '12, May 20-24, 2012, 12 pages, ACM, Scottsdale, Arizona, USA.

Soliman, Mohamed A., et al., "Orca: A Modular Query Optimizer Architecture for Big Data," SIGMOD'14, Jun. 22-27, 2014, 12 pages, ACM, Snowbird, Utah, USA.

Antova, Lyublena, et al., "An Integrated Architecture for Real-Time and Historical Analytics in Financial Services," Real-Time Business Intelligence and Analytics—International Workshops (BIRTE 2015), Aug. 31, 2015, 8 pages, Kohala Coast, HI, USA.

Antova, Lyublena, et al., "Rapid Adoption of Cloud Data Warehouse Technology Using Datometry Hyper-Q," Month Unknown, 2017, 12 pages, Datometry, Inc., retrieved from https://dtm-website-assets.s3.us-east-2.amazonaws.com/wp-content/uploads/2017/09/Rapid-Adoption-of-Cloud-Data-Warehouses-Using-Adaptive-Data-Virtualization-Technology.pdf.

Author Unknown, "46.2. Message Flow," PostgreSQL 9.2.24 Documentation, Chapter 46: Frontend/Backend Protocol, Nov. 9, 2017, 8 pages, The PostgreSQL Global Development Group, retrieved from https://www.postgresql.org/docs/9.2/static/protocol-flow.html.

Author Unknown, "46.5. Message Formats," PostgreSQL 9.2.24 Documentation, Chapter 46: Frontend/Backend Protocol, Nov. 9, 2017, 11 pages, The PostgreSQL Global Development Group, retrieved from https://www.postgresql.org/docs/9.2/static/protocol-message-formats.html.

Author Unknown, "Reference/ipcprotocol," Feb. 13, 2017, 8 pages, retrieved from http://code.kx.com/wiki/Reference/ipcprotocol.

Author Unknown, "Replatforming Custom Business Intelligence," Case Study, Month Unknown 2018, 2 pages, Datometry, Inc., retrieved from https://datometry.com/wp-content/uploads/2018/03/x_Case_Study_Replatform_Business_Intelligence_Azure_.pdf.

Bear, Chuck, et al., "The Vertica Database: SQL RDBMS for Managing Big Data," MBDS'12, Sep. 21, 2012, 2 pages, ACM, San Jose, CA, USA.

Bornea, Mihaela A., et al., "One-Copy Serializability with Snapshot Isolation Under the Hood," 2011 IEEE 27th International Conference on Data Engineering, Apr. 11-16, 2011, 12 pages, IEEE, Hannover, Germany.

Cecchet, Emmanuel, et al., "Middleware-based Database Replication: The Gaps Between Theory and Practice," SIGMOD'08, Jun. 9-12, 2008, 14 pages, Vancouver, Canada.

Chang, Lei, et al., "HAWQ: A Massively Parallel Processing SQL Engine in Hadoop," SIGMOD'14, Jun. 22-27, 2014, 12 pages, ACM, Snowbird, Utah, USA.

Elnikeiy, Sameh, et al., "Tashkent: Uniting Durability with Transaction Ordering for High-Performance Scalable Database Replication," EuroSys'06, Apr. 18-21, 2006, 14 pages, ACM, Leuven, Belgium.

Flores, Carlos, et al., "SeDiM: A Middleware Framework for Interoperable Service Discovery in Heterogeneous Networks," ACM Transactions on Autonomous and Adaptive Systems, Feb. 2011, 8 pages, vol. 6, No. 1, Article 6, ACM, New York, NY, USA.

Garland, Simon, "Big Data Analytics: Tackling the Historical Data Challenge," CIOReview, Month Unknown 2014, 3 pages, retrieved from https://data-analytics.cioreview.com/cxoinsight/big-data-analytics-tackling-the-historical-data-challenge-nid-4298-cid-156.html.

(56) References Cited

OTHER PUBLICATIONS

Gog, Ionel, et al. "Musketeer: all for one, one for all in data processing systems," EuroSys'15, Apr. 21-24, 2015, 16 pages, ACM, Bordeaux, France.
Gray, Jim, et al., "The Dangers of Replication and a Solution," Technical Report—MSR-TR-96-17, SIGMOD '96, Jun. 4-6, 1996, 12 pages, ACM, Montreal, Quebec, Canada.
Heimbigner, Dennis, et al., "A Federated Architecture for Information Management," ACM Transactions on Information Systems (TOIS), Jul. 1985, 26 pages, vol. 3, Issue 3, New York, NY, USA.
Hohenstein, Uwe, et al., "Improving Connection Pooling Persistence Systems," 2009 First International Conference on Intensive Applications and Services, Apr. 20-25, 2009, 7 pages, IEEE, Valencia, Spain.
Hwang, San-Yih, "The MYRIAD Federated Database Prototype," SIGMOD '94 Proceedings of the 1994 ACM SIGMOD International Conference on Management of Data, May 24-27, 1994, 1 page, ACM, New York, New York, USA.
Kache, Holger, et al., "POP/FED: Progressive Query Optimization for Federated Queries in DB2," VLDB '06, Sep. 12-15, 2006, 4 pages, ACM, Seoul, Korea.
Lin, Yl, et al., "Middleware based Data Replication Providing Snapshot Isolation," SIGMOD 2005, Jun. 14-16, 2005, 12 pages, ACM, Baltimore, Maryland, USA.
Non-Published Commonly Owned U.S. Appl. No. 16/270,575, filed Feb. 7, 2019, 36 pages, Datometry, Inc.
Non-Published Commonly Owned U.S. Appl. No. 16/542,133, filed Aug. 15, 2019, 70 pages, Datometry, Inc.
Non-Published Commonly Owned U.S. Appl. No. 16/542,140, filed Aug. 15, 2019, 70 pages, Datometry, Inc.
Non-Published Commonly Owned U.S. Appl. No. 16/542,143, filed Aug. 15, 2019, 71 pages, Datometry, Inc.
Non-Published Commonly Owned U.S. Appl. No. 16/542,145, filed Aug. 15, 2019, 71 pages, Datometry, Inc.
Non-Published Commonly Owned U.S. Appl. No. 16/542,146, filed Aug. 15, 2019, 71 pages, Datometry, Inc.
Non-Published Commonly Owned U.S. Appl. No. 16/542,148, filed Aug. 15, 2019, 71 pages, Datometry, Inc.
Non-Published Commonly Owned U.S. Appl. No. 16/599,049, filed Oct. 10, 2019, 54 pages, Datometry, Inc.
Non-Published Commonly Owned U.S. Appl. No. 16/599,055, filed Oct. 10, 2019, 53 pages, Datometry, Inc.
Non-Published Commonly Owned U.S. Appl. No. 16/599,057, filed Oct. 10, 2019, 54 pages, Datometry, Inc.
Non-Published Commonly Owned U.S. Appl. No. 16/599,061, filed Oct. 10, 2019, 53 pages, Datometry, Inc.
Non-Published Commonly Owned U.S. Appl. No. 16/599,064, filed Oct. 10, 2019, 53 pages, Datometry, Inc.
Non-Published Commonly Owned U.S. Appl. No. 16/599,066, filed Oct. 10, 2019, 53 pages, Datometry, Inc.
Non-Published Commonly Owned U.S. Appl. No. 16/599,071, filed Oct. 10, 2019, 53 pages, Datometry, Inc.
Owrang O., M. Mehdi, et al., "A Parallel Database Machine for Query Translation in a Distributed Database System," SAC '86: Proceedings of the 1986 Workshop on Applied Computing, Oct. 1986, 6 pages.
Plattner, Christian, et al., "Ganymed: Scalable Replication for Transactional Web Applications," Middleware '04, Oct. 18-22, 2004, 20 pages, Toronto, Canada.
Wang, Jinfu, et al., "Anomaly Detection in the Case of Message Oriented Middleware," MidSec '08, Dec. 1-5, 2008, 3 pages, ACM, Leuven, Belgium.
Whitney, Arthur, et al., "Lots o' Ticks: real-time high performance time series queries on billions of trades and quotes," ACM SIGMOD 2001, May 21-24, 2001, 1 page, ACM, Santa Barbara, California, USA.
Zhang, Mingyi, et al., "Workload Management in Database Management Systems: A Taxonomy," IEEE Transactions on Knowledge and Data Engineering—Manuscript, Month Unknown 2017, 18 pages, IEEE.
Author Unknown, "Greenplum Database: Critical Mass Innovation," Architecture White Paper, Aug. 2010, 17 pages, EMC Corporation, San Mateo, CA, USA.
Author Unknown, "Informatica Data Services," Data Sheet, Month Unknown, 2015, 4 pages, Informatica LLC, Redwood City, CA, USA.
Author Unknown, "Informatica PowerCenter Data Virtualization Edition," Data Sheet, Month Unknown, 2013, 8 pages, Informatica LLC, Redwood City, CA, USA.
Author Unknown, "Introduction to InfoSphere Federation Server," IBM InfoSphere Foundation Tools IBM nfoSphere Information Server, Version 8.7.0, Oct. 1, 2011, 4 pages, IBM Corporation, Armonk, NY, USA.
Author Unknown, "MemSQL Overview," White Paper, Aug. 2018, 4 pages, MemSQL Inc, San Francisco, CA, USA.
Author Unknown, "Microsoft Analytics Platform System," Jan. 2016, 2 pages, Microsoft Corporation, retrieved from https://download.microsoft.com/download/B/3/8/B38DFD5A-7AFF-43D1-A449-38E84FF68CC0/Analytics_Platform_System_Dalasheet.pdf.
Author Unknown, "Teradata Vantage," Data Sheet, Month Unknown 2018, 3 pages, Teradata Corporation, San Diego, CA, USA.
Author Unknown, "The 21st Century Time-series Database," White Paper, Jul. 2016, 10 pages, Kx Systems, Inc., Newry, United Kingdom.
Author Unknown, "The Denodo Platform 7.0," White Paper, Month Unknown, 2018, 44 pages, Denodo Technologies, Palo Alto, CA, USA.
Gorman, Ciarán, "Columnar Database and Query Optimization," Technical Whitepaper, Mar. 2013, 26 pages, Kx Systems, Inc., Newry, United Kingdom.
Hanna, James, "Multi-Partitioned kdb+ Databases: An Equity Options Case Study," Technical Whitepaper, Oct. 2012, 13 pages, Kx Systems, Inc., Newry, United Kingdom.
Pullokkaran, Laljo John, "Analysis of Data Virtualization & Enterprise Data Standardization in Business Intelligence," Working Paper CISL# 2013-10, May 2013, 60 pages, Massachusetts Institute of Technology, Cambridge, Massachusetts, USA.
Schlamb, Kelly, "dashDB: Self-service data warehousing in the cloud at any scale," DB2 Tech Talk, Jun. 25, 2015, 55 pages, IBM Corporation, Armonk, New York.

\* cited by examiner

CLOUD PROVIDER CONSOLE

①

Suggested Actions:
> Find better home for my OldDB Database

②

Location of Current Database Instance:

http://<Please Enter URL or IP Address.>

Administrator Login: <username>

Administrator Password: <password>

SUBMIT

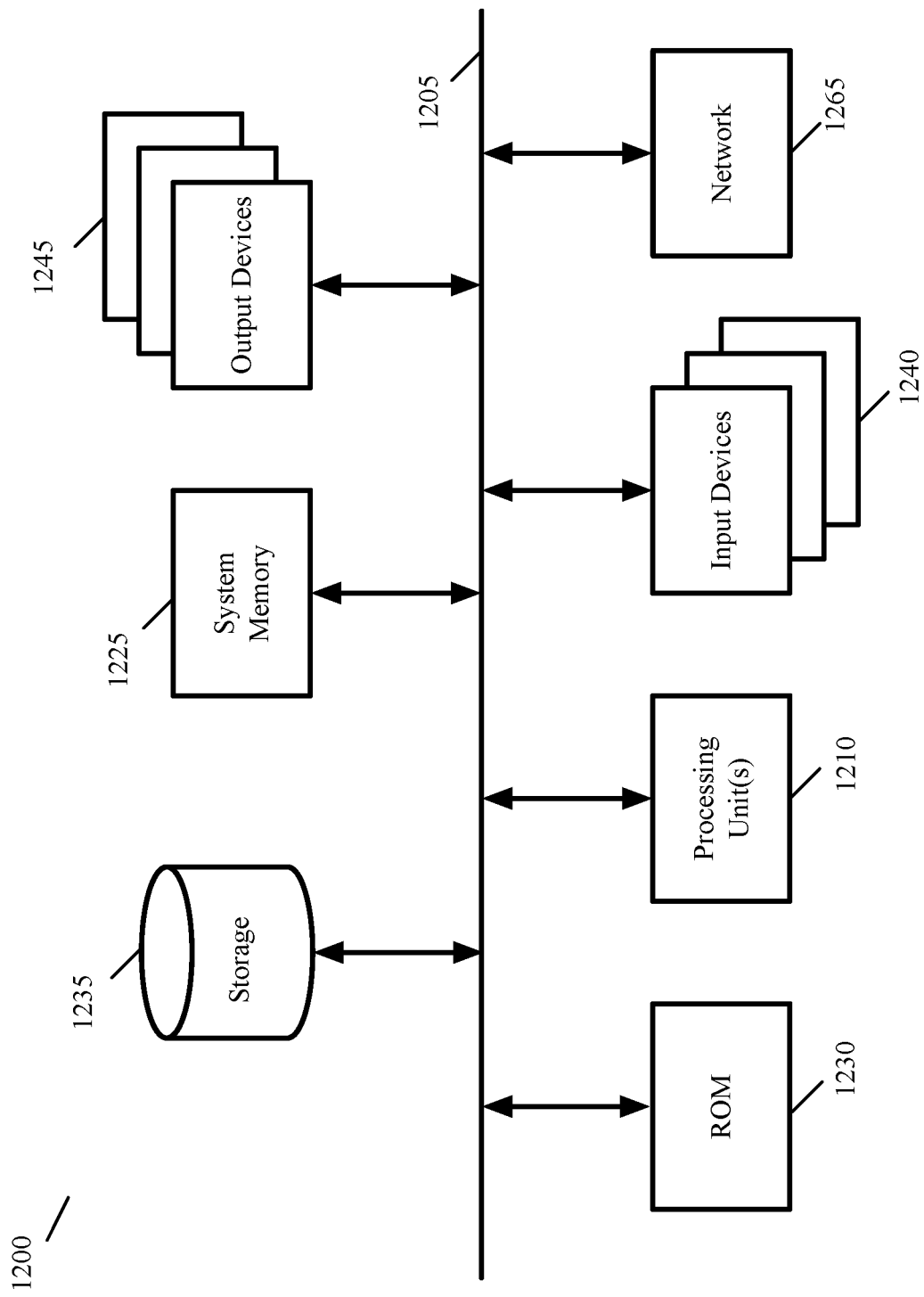

ONE-CLICK DATABASE MIGRATION WITH AUTOMATIC SELECTION OF A DATABASE

BACKGROUND

The advantages of modern data-warehouse-as-a-service (DWaaS) systems have motivated many companies to migrate from on-premises warehouse systems (e.g., Teradata or Oracle) to cloud-native systems (e.g., Microsoft Azure SQL or Amazon Redshift). Adaptive data virtualization can reduce the costs of data warehouse migration by translating queries in real time from the on-premise system to the new vendor's system, which may differ in SQL dialect, wire protocol, data formats, and supported features. This shortens the time for rewriting data warehouse applications from years to days or weeks. However, migration of the underlying database (equivalently referred to as "replatforming") itself is a tedious, error-prone, and risk-laden process due to the involved logistics. For example, the functional and physical requirements of the original database system must be evaluated and compared against the corresponding characteristics of prospective new database systems. Furthermore, individual steps of migration must be performed, including transfer of the database schema, transfer of the bulk data, and installation of adaptive data virtualization. These are highly manual operations requiring manual human intervention and consultation at every step.

BRIEF SUMMARY

Some embodiments of the invention provide a novel database recommendation and migration engine for fully automated database migration. The database recommendation and migration engine executes all logistics, requiring in some embodiments only a single user action (for example, a single click in a graphical user interface) to initiate end-to-end automation of the entire migration process. This process includes automation of the extraction of relevant information for making the replatforming decision and migration of data, with protocol in some embodiments for the handling of exceptional situations (e.g., database provisioning failure) which may include rollback and/or retries. Monitoring and reporting on the process is also provided in some embodiments for real-time evaluation.

In some embodiments, the database recommendation and migration engine inspects an existing original database and identifies a suitable candidate database system as the candidate database for migration. The engine then provisions the new candidate database and transfers the schema and data from the original database system. In some embodiments, this requires installing an adaptive data virtualization component, which seamlessly redirects or duplicates queries from applications written for the original database system to the new candidate database system. These operations can be aborted or rolled back at any time and at any stage in the process, e.g. if the inspection of the original database reveals that the candidate system is unsuitable or a poor operational or functional match as a migration candidate.

In some embodiments, the database recommendation and migration engine is a management component and corresponding interface overlaid on other software components (such as an adaptive data virtualization system). The database recommendation and migration engine has a number of components in some embodiments that perform the various operations described above. In the context of cloud databases, these components can be fully integrated into a cloud Software-as-a-Service (SaaS) or Data-Warehouse-as-a-Service (DWaaS) offering from a cloud service provider or database service provider.

For example, in some embodiments a Migration Manager module coordinates all operations and provides a user interface for input regarding evaluating the existing original database, identifying the candidate database, and performing the actual data migration. In some such embodiments, the Migration Manager user interface provides a "one-click" facility for the user to initiate the entire process in a fully automated fashion with only a single action.

In addition, in some embodiments a Database Inspector module extracts logs and schemas from the original database for analysis. Based on the results of the analysis, the Database Inspector module determines the functional and physical requirements of the original database and matches these to candidate databases to determine which candidate database system would be most suitable for performing the workload.

After a candidate database system has been identified, in some embodiments a Database Provisioning module creates a new instance of the desired candidate database system according to the requirements of the analysis from the Database Inspector module. After the new database has been provisioned, in some embodiments a Content Transfer module converts the schema from the original database to the new database and transfers all the data from the original database to the new candidate database.

After the data has been transferred, in some embodiments a Migration Verifier module tests the performance and validity of the migration by performing side-by-side analyses of identical queries and tests against both databases and comparing the results. The Migration Verifier module can perform a roll back of the migration if it determines that equivalence has not been achieved.

If the results of the migration are acceptable, then in some embodiments a Nameserver Switcher module modifies the corresponding domain name services (DNS) settings to seamlessly and transparently redirect client application queries from the original database to the new candidate database (and vice versa).

In some embodiments a Migration Monitor module also provides real-time updates on each stage of the process described above. The Migration Monitor module communicates with each of the other modules and provides the status information to the Migration Manager for inclusion into the user interface, for example as a graphical dashboard overview.

As noted above, in some embodiments the Migration Manager module provides a user interface for initiating the migration process and providing feedback of its progress. The user interface may be a stand-alone service or may be integrated into the cloud service provider's console. Initially, the user provides a location (e.g., an IP address) of the original database and administrative credentials. This information allows the Database Inspector module to extract the original database logs and system parameters. In some embodiments, the user interface then presents the user with a functional assessment of the current system and an operational recommendation for candidate systems. The user interface may also present the user with user control items to select/confirm the candidate system and begin the recommended migration process.

Upon initiating the migration process, in some embodiments the Database Provisioning module provisions the new database, and the Content Transfer module transfers the schema and data in fully automated fashion. The Migration Monitor module in some embodiments updates the user interface to provide detailed reporting to the user during these operations, including any errors. After the migration is complete, in some embodiments the user interface provides a summary report from the Migration Verifier module with the result of the migration process and validation testing. In some embodiments, the user interface then provides another user control item to the user to begin using the new candidate database in place of the original database, which will trigger the Nameserver Switcher module to redirect traffic from the client application to the new candidate database.

In some embodiments, the user interface provides a single "one-click" user interface control to perform all of the above data migration processes in fully automated fashion. For example, after the user has entered the administrative credentials, if the analysis determines that 100% compatibility is possible, then the user may elect to proceed with all recommended choices. In such a single-click scenario, the database recommendation and migration engine would automatically select the candidate database and perform the provisioning, migration, and cut-over operations without any further user interaction. If 100% compatibility is not possible, then in some embodiments the user may be provided an option to exclude incompatible queries or applications from the analysis so that the migration can be scoped down to a fully compatible subset.

As noted above, in some embodiments the Database Inspector module makes a recommendation of suitable candidate database for migration based on the analysis of the original database logs and schema. In order to provide the recommendation, in some embodiments the Database Inspector module refers to a system repository that includes a set of data for each supported candidate database type. Each data set contains a curated and maintained description of the physical limits of the candidate database, benchmark data, and pricing data.

In some embodiments the Database Inspector module also includes a matching engine that compares the results of the inspection of the original database against the data sets for each candidate system in the system repository. In some embodiments, this comparison includes determining a compatibility index such as a distance in a feature space. The comparison takes into account the functional compatibility of the original and candidate systems and represents the results in a feature space. For example, the comparison could rank the candidate systems in a multi-dimensional space of compatibility index vs. anticipated cost, e.g. financial cost or the cost of manually changing the features used by the application to be compatible with the new target system.

The Database Inspector module may also perform empirical testing in some embodiments instead of using canned benchmark data. For example, it may run a sample of the actual workload from the original database on each candidate database to assess performance. The results of these empirical tests may also be used to refine the comparison and be incorporated into the compatibility index.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 12 conceptually illustrates an electronic system with which some embodiments of the invention are implemented.

DETAILED DESCRIPTION

Some embodiments of the invention provide a novel database recommendation and migration engine for fully automated database migration (also referred to as replatforming). The database recommendation and migration engine executes all logistics, requiring in some embodiments only a single user action (for example, a single click in a graphical user interface) to initiate end-to-end automation of the entire migration process. This process includes automation of the extraction of relevant data for making the replatforming decision, and of the migration of data, with protocol for the handling of exceptional situations (e.g., database provisioning failure) which may include rollback and/or retries. Monitoring and reporting on the process is also provided for real-time evaluation.

Figure 1:
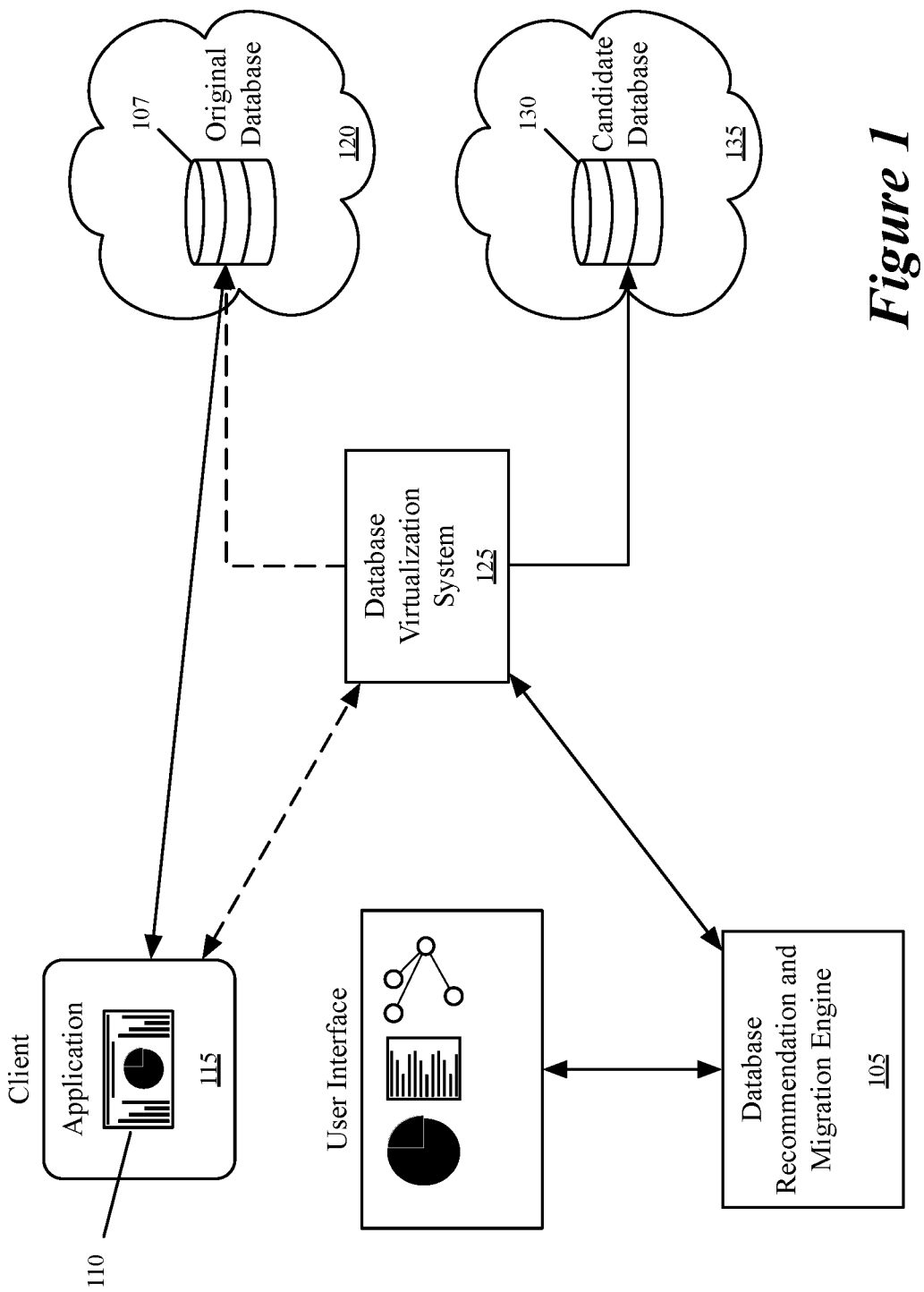
FIG. 1 conceptually illustrates the role of the database recommendation and migration engine in some embodiments.

FIG. 1 conceptually illustrates the role of the database recommendation and migration engine 105 in some embodiments. The original database 107 executes queries from database applications 110 running on database clients 115. These clients communicate with the database through a network in some embodiments, and the applications have read and write access to the database. In some embodiments, the original database 107 may be an on-premises database such as systems from Teradata or Oracle Corporation. For example, in some embodiments the database may execute on a host machine, and store data in a run-time storage structure, which can be located on the host machine or may be located on another host. In other embodiments the original database 107 may be an instance hosted by a cloud-based data warehouse 120, such as Azure SQL Data Warehouse or Amazon Redshift. Irrespective of where the original database 107 is hosted, the application queries may be directly executed on the database or (as indicated by the dashed arrow) executed via an instance of a database virtualization system 125 (e.g., Datometry HyperQ).

The database recommendation and migration engine 105 inspects the workload of the existing original database 107 to assess the operational and functional requirements. The engine 105 then identifies at least one database system 130 as a target candidate for migration. In some embodiments, the candidate database system may be an instance hosted by a cloud-based data warehouse 135, such as Azure SQL Data Warehouse or Amazon Redshift. The engine 105 then provisions the new candidate database 130 and migrates the schema and data from the original database system 107. The engine 105 also presents a user interface 130 for managing the migration process. In some embodiments, the engine 105 uses the database virtualization system to seamlessly redirect and translate queries from the applications 110 written for the original database 107 to the new candidate database 130. These operations can be aborted or rolled back at any time and at any stage in the process, e.g. if the inspection of the original database reveals that the candidate system is unsuitable or a poor operational or functional match as a migration candidate.

Figure 2:
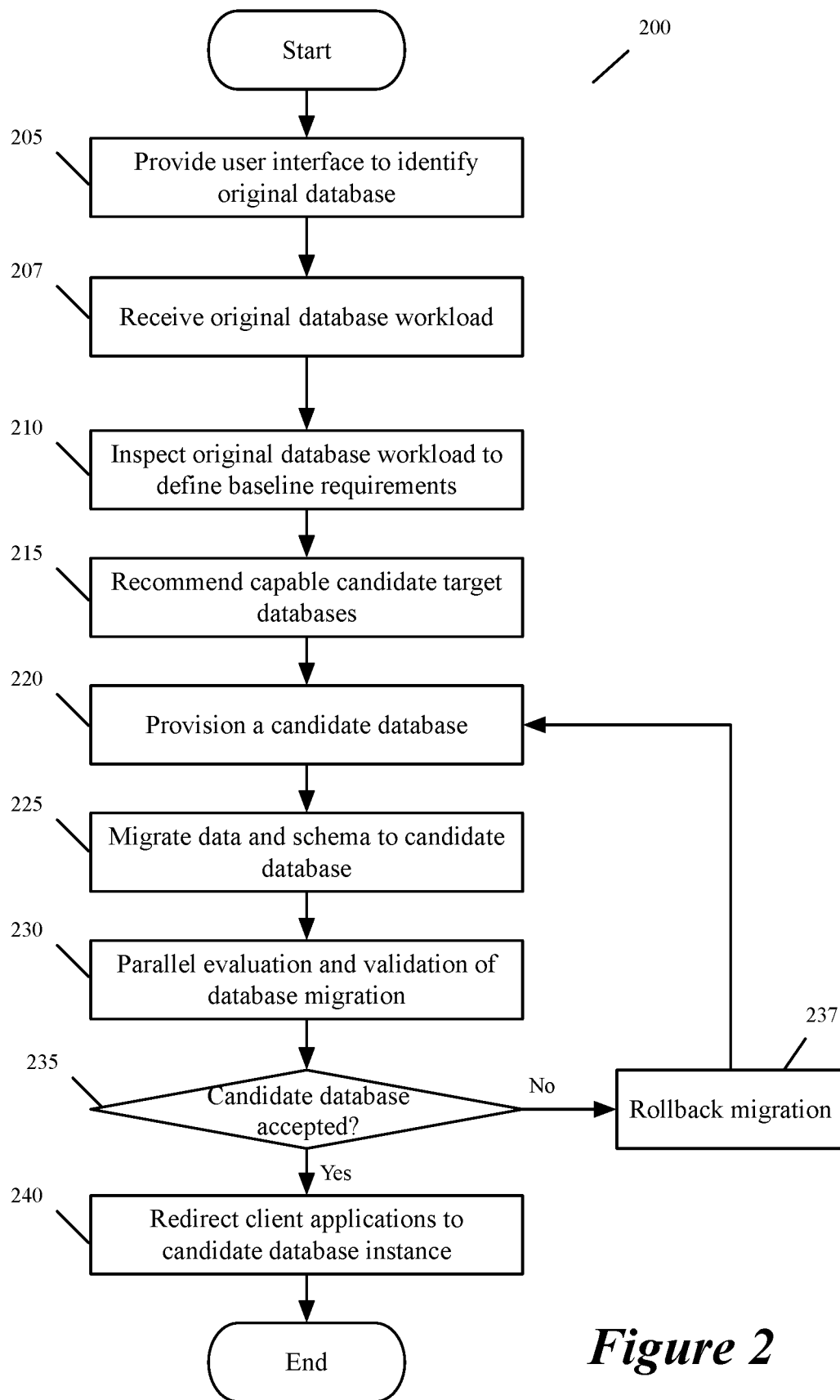
FIG. 2 describes a process performed by the Migration Manager for recommending a candidate database for migration from an original database.

In some embodiments, the database recommendation and migration engine is a management component and corresponding interface overlaid on other software components. The database recommendation and migration engine has a number of components in some embodiments that perform the various operations described above. In the context of cloud databases, these components can be fully integrated into a cloud Software-as-a-Service (SaaS) or Data-Warehouse-as-a-Service (DWaaS) offering from a cloud service provider or database service provider. The operations of the database recommendation and migration engine and its various modules in some embodiments are described by reference to process 200 in FIG. 2. The architecture of the database recommendation and migration engine 300 and its various component modules in some embodiments are conceptually illustrated in FIG. 3.

The process 200 is performed in some embodiments by a Migration Manager module 305, which coordinates all operations of the various modules. In some embodiments, some operations of the process 200 are directly performed by the components of the database recommendation and migration engine 300. The Migration Manager 305 may directly communicate with each component of the database recommendation and migration engine 300 to provide them with the user input and begin their operations, as well as receive feedback from each of the components as they perform and complete their operations. The components may also be configured by the Migration Manager 305 to directly communicate with each other as needed.

The process 200 begins by providing at 205 a user interface 310 for input to identify the original database 315. In some embodiments, the user interface 310 also receives input to select a particular candidate database 320 for evaluation. In some embodiments, the user also specifies specific applications. As a result of this selection, the migration task is customizable to the scope of only the selected applications. The user interface 310 may also provide in some embodiments a "one-click" facility for the user to initiate the entire migration process in a fully automated fashion with only a single user action, as described in further detail below.

The process 200 receives at 207 the workload from the identified original database 315. In some embodiments, the workload includes the original database schema, query logs, and operational metadata generated by the original database during execution of the queries on the database. If certain applications have been selected, then the schema and logs (e.g. database objects) that are touched by the selected applications are the only ones that will be extracted for inspection. In some embodiments, a Database Inspector module 325 extracts the workload for this analysis, as described in further detail below. The operations of the Database Inspector may be performed in some embodiments by a database insight system (e.g., Datometry QInsight). Further details of the database insight system can be found in U.S. patent application Ser. No. 16/599,049 filed on Oct. 10, 2019, titled "Quantifying Complexity Of A Database Query," which is incorporated herein by reference.

Upon receiving the workload, the process 200 inspects at 210 the workload of the original database 315, and uses the result of the inspection to define a baseline of physical and functional requirements of the original database. The process 200 recommends at 215 candidate databases that are capable to perform the workload after migration. The recommendation is based in some embodiments on matching the physical and functional baseline to characteristic information about the multiple database candidates, and calculating differentials in cost between the original database and candidate databases for performing the database workload. In some embodiments, these operations are performed by the Database Inspector 325.

In some embodiments, the recommendation is based on a compatibility assessment (e.g., a compatibility indicator or a quantitative index or score) that is determined for each candidate database. This allows the user to make a judgement call as to whether partial compatibility (i.e., less than 100% compatibility) is acceptable. If 100% compatibility is not possible, then in some embodiments the user may be provided an option to exclude incompatible queries or applications from the analysis so that the migration can be scoped down to a fully compatible subset. In some embodiments, the user interface 310 presents compatibility assessments of multiple candidate databases ranked by their compatibility index, and presents another user control to either proceed with the most compatible candidate or select another less compatible candidate. In some embodiments, the highest-ranked candidate is automatically selected for migration.

After a capable candidate database system has been identified and selected, the process 200 provisions at 220 a new instance of the candidate database system 320. In some embodiments, a Database Provisioning module 330 provisions the candidate database according to the requirements of the analysis from the Database Inspector module 325.

The process 200 migrates at 225 the database schema and data from the original database 315 to the newly provisioned candidate database 320. In some embodiments, a Content Transfer module 335 performs this operation. Transferring data requires a data conversion in some embodiments, to generate data compatible with the new candidate database. In addition, the transfer process may use mechanisms of the source system to export contents to a transferrable data formats like binary or text files. In some embodiments, the Content Transfer module 335 is directly activated by the Database Provisioning module 330. In other embodiments, Content Transfer module 335 proceeds upon receiving further input from the user interface 310.

If, as discussed above, only certain applications have been selected for migration, then only database objects that are touched by the selected applications will be transferred. In some embodiments, transferring the schema includes a translation process for database objects and for the database queries, performed by the database virtualization system 337 (e.g., Datometry HyperQ), from the syntax and semantics of the original database to the different syntax and semantics of the candidate database.

In some embodiments, only a sliver of each table is transferred. This allows the user to evaluate the migration in a trial mode before committing to the cost of the new database system. If the user is satisfied (e.g., after a trial period), then they can activate a full transfer mode which will transfer the rest of the data.

The process 200 evaluates at 230 the performance and validity of the migration by performing side-by-side analyses of identical queries and tests against both the original 315 and provisioned candidate 320 databases in parallel, and comparing the results. Executing the query against the original database provides a ground truth for the comparison. The result of executing the query against a candidate database should be identical to the result from executing the query on the original database. If the result is not identical, then the discrepancy can be presented to the user on a per-query basis or an aggregated basis (e.g., by application, over the entire workload, etc.). The user in some embodiments determines whether the discrepancy is acceptable or not with regards to evaluating the candidate database. In some embodiments, a Migration Verifier module 340 performs this operation, using the database workload from the Database Inspector 325. In some embodiments, the Migration Verifier 340 automatically performs the parallel evaluation after receiving a signal from the Content Transfer module 335 that the transfer of the schema and the data is complete.

In some embodiments, the process uses the database virtualization system (DVS) 337 to evaluate the queries in the workload (e.g., the log) on the candidate database. The DVS 337 takes each query from the log, which is formatted for the original database, and translates it into different syntax and semantics for execution on the candidate database. In some embodiments, the DVS translates the queries in several stages, using a Parser component that translates the query to an abstract syntax representation, a Binder component that binds the syntax to an algebraic representation of the query from which the query's semantic components can be identified, and a Query Transformer component that generates a new query for the candidate database using the algebraic representation. Further details of the operations of the Parser, Binder, and Query Transformer can be found in U.S. patent application Ser. No. 16/270,575, filed on 7 Feb. 2019, titled "High-Throughput Adaptive Data Virtualization Via Context-Aware Query Routing," which is incorporated herein by reference.

The process 200 then determines at 235 whether the candidate database is accepted for migration, based on the result of the parallel evaluation. In some embodiments, the determination is automated, based on a set of criteria (e.g., a threshold value for the compatibility index). In other embodiments, the results of the parallel evaluation are presented to the user on the user interface 310 for a decision as to whether to accept the candidate database 320.

If the candidate database is not accepted, then in some embodiments the process 200 performs at 237 a roll back of the migration. This rollback operation is performed in some embodiments by the Migration Verifier 340. Instead of a full rollback, in some embodiments this could be reduced into flagging warnings or local errors if equivalence is not achieved in a limited/localized number of cases. The process 200 then returns in some embodiments to 220 to provision another candidate database for evaluation. The next candidate may be selected and provisioned automatically in some embodiments based on ranked compatibility index, or may be selected by the user through the user interface 310 in other embodiments.

If the process 200 determines at 235 that the candidate database is acceptable, then the process redirects at 240 client application queries from the original database 315 to the new candidate database 320 (and vice versa for query responses). This is performed in some embodiments by modifying the corresponding domain name services (DNS) settings for seamless and transparent traffic redirection. The redirected client application queries are redirected using DNS via the DVS 337 in some embodiments. In some embodiments, this operation is performed by a Nameserver Switcher module 345 based on input via the user interface 310. The Nameserver Switcher may also perform the switch (also referred to as "cut-over") in some embodiments upon notice from the Migration Verifier 340 that the migration is complete and has been validated.

In some embodiments, the Nameserver Switcher informs the Migration Manager 305 that cut-over has been completed. The process 200 then ends. After cut-over, new queries (not shown) incoming from the database applications are routed through the DVS 337 in some embodiments, to translate the new queries on the fly to the syntax of the candidate database.

In some embodiments, a Migration Monitor module 350 provides real-time updates on the operations of each module while performing process 200 as described above. The Migration Monitor module communicates with each of the other modules 325-345 and provides the status information to the Migration Manager 305 for inclusion into the user interface 310, for example as a graphical dashboard overview.

Figure 3:
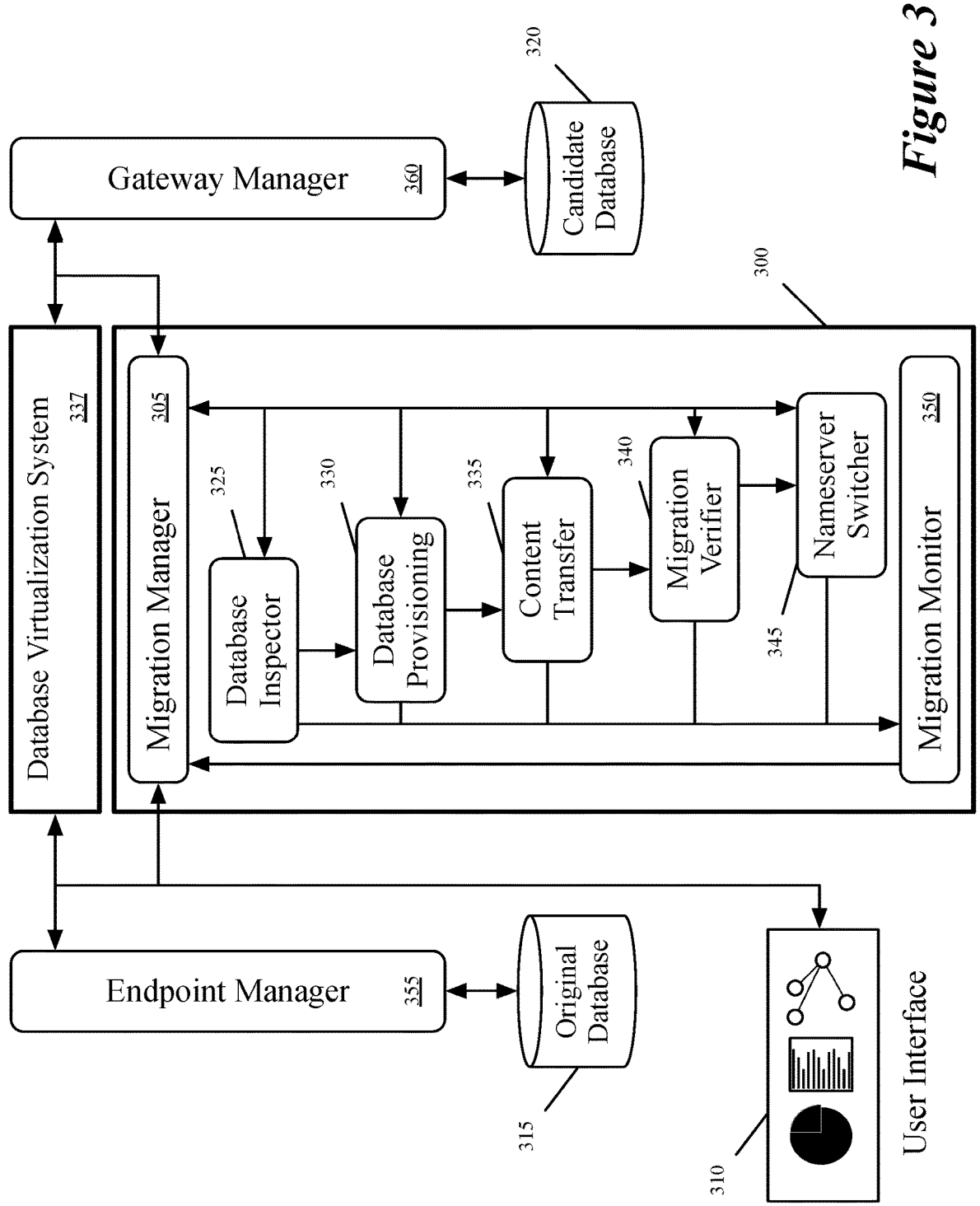
FIG. 3 conceptually illustrates the architecture of the database recommendation and migration engine.

In some embodiments, each of the individual modules of the database recommendation and migration engine 300 described in FIG. 3 directly communicate with the original database 315 and the candidate database 320 as needed. In other embodiments, bidirectional communication between the engine 300 and the original database is handled by an Endpoint Manager 355, which listens to incoming messages on the port used by the original database 315. In some embodiments, the Endpoint Manager 355 also handles communication between the original database 315 and the DVS 337. In a similar fashion, a Gateway Manager 360 handles all communication with the candidate database 320 in some embodiments. As with the Endpoint Manager 355, the Gateway Manager 360 may also perform the same functions for the DVS 337. In some embodiments, the Endpoint Manager 355 and the Gateway Manager 360 are components of the DVS 337.

The Gateway Manager 360 may include in some embodiments an Open Database Connectivity (ODBC) Server component (not shown) which is an abstraction of ODBC Application Programming Interfaces (APIs) that allow communication with different candidate database systems using their corresponding ODBC drivers. ODBC APIs provide the means to submit different kinds of requests to the candidate database for execution, ranging from simple queries/requests to multi-statement requests, transactions, parameterized queries, and stored procedure calls. In some embodiments, the ODBC Server is implemented as a separate component from the Gateway Manager 360.

Figure 4:
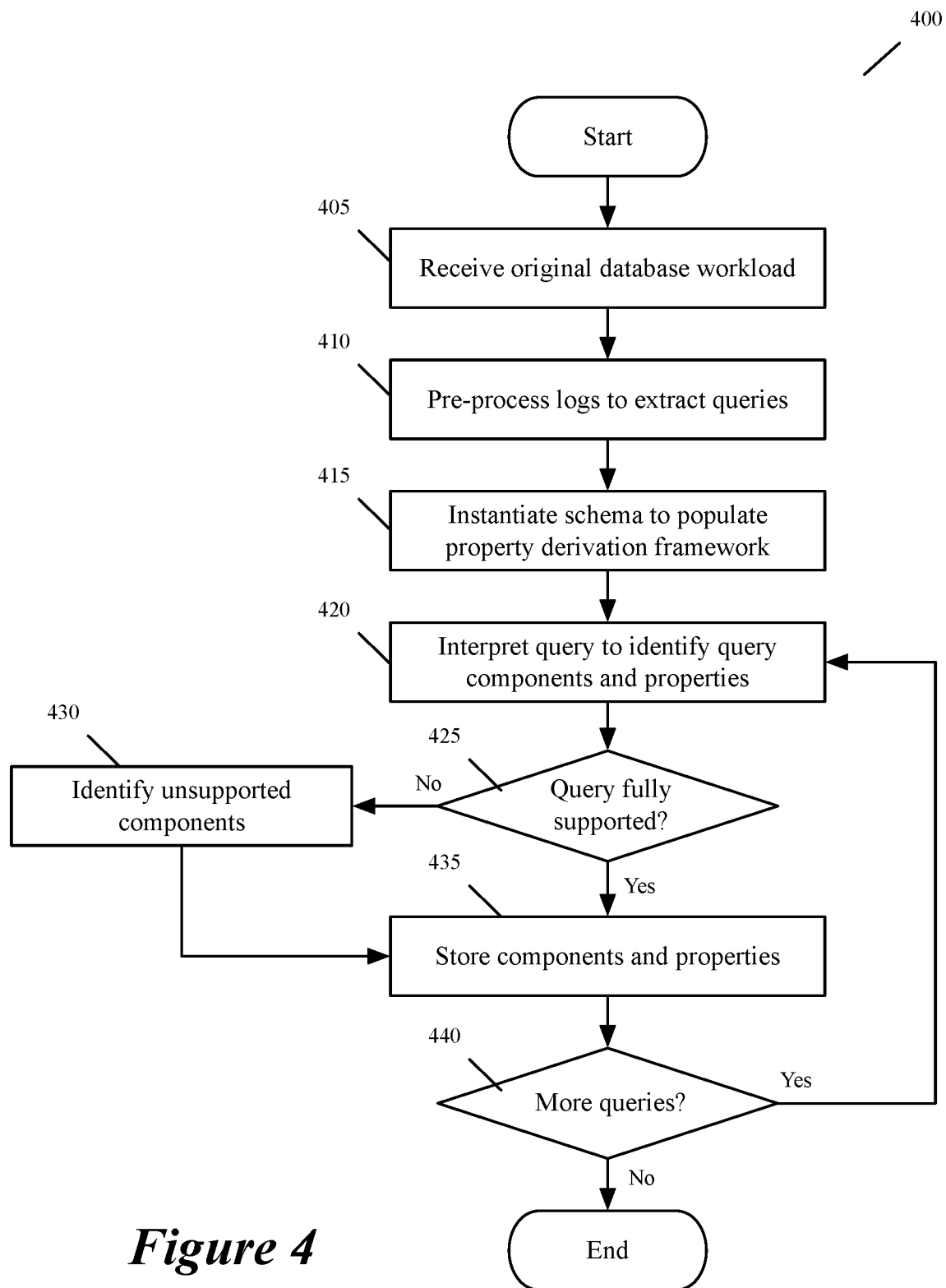
FIG. 4 describes a process for inspection of the original database.

FIG. 4 conceptually illustrates a process 400 for inspecting the workload of the original database 315. This process corresponds in some embodiments to operation 210 of process 200 described in FIG. 2 above. In some embodiments, at least a portion of process 400 is performed by the Database Inspector module 325 of the database recommendation and migration engine 300, whose architecture is conceptually illustrated in FIG. 5. In some embodiments, at least a portion of process 400 is performed by the database virtualization system 337.

The process 400 receives at 405 the workload from the original database 315. The workload includes a record of the queries issued on the database (e.g. the log), the database schema, and operational metadata generated by the original database during query execution. In some embodiments, these are extracted from the original database using a tailored script that is generated based on information provided through the user interface 310. In some embodiments, the workload is extracted from the original database 315 by an extractor module 510 of the Database Inspector 500, which generates the extraction script based on the provided information. The provided information includes in some embodiments filtering information, such as specific applications or periods of time.

In some embodiments the database owner provides administrative credentials through the user interface so that the process 400 can directly transfer and execute the generated script on the original database. In some such embodiments, this generated script is transferred and executed on the original database 315 by the Extractor module 510 of the Database Inspector 500. In other embodiments, the script is downloaded by the database owner, who executes it on the original database 315, so that for added security the process 400 does not have access to the administrative credentials. Executing the script on the original database creates an output archive file containing the workload, which in some embodiments is uploaded through the user interface 310.

The process 400 performs pre-processing operations at 410 on the extracted logs, in order to extract individual queries. In some embodiments, the pre-processing operations are performed by a Query Processor module 515 of the Database Inspector 500. Each query includes at least one SQL statement or other database command. SQL statements include Data Definition Language (DDL) statements for modifying the database and Data Manipulation Language (DML) statements for modifying the data stored in the database. The pre-processing operations include reconstructing individual queries from multiple tables and across multiple rows as needed, removing duplicate queries, and batching or unbatching queries. In embodiments where the user has selected a candidate database for evaluation, the pre-processing operations are tailored to optimize the queries for the selected candidate.

In some embodiments, the queries in the log are also reorganized into individual sessions and each session is processed in parallel in order to avoid errors from referencing temporary objects that are unique to particular sessions, as well as achieve a time acceleration factor in processing the queries relative to real-time. Each session's query is then interpreted in some embodiments one at a time, in the order that they were originally executed in the log. Some embodiments reorganize queries into sessions based on a session identifier from the log.

The process 400 instantiates at 415 the extracted schema using the database virtualization system (DVS) 337. In some such embodiments, the instantiated schema is used to populate a property derivation framework (not shown) of the DVS 337 that describes properties for each component of the query. In some embodiments, the query components may include references to a set of one or more objects in the database, and at least one command that specifies an operation with respect to the referenced database objects. In some embodiments, the properties include a grouping of the components according to component types and a number of each component type in the database query.

The properties for the query components in some embodiments includes a command type for the command, and attributes associated with the referenced database objects, such as the number of referenced database objects in the query, the object types for the referenced database objects, etc. In some embodiments, a component type can specify whether the referenced object is one of a persistent table, a temporary table, a view, a column, a macro, and a stored procedure.

The command type in some embodiments can also specify whether the command is a SQL command or a non-SQL command. In some embodiments, the set of properties can specify an operation type for the operation specified by the command. Examples of operation types include an inner join operation, an outer join operation, an implicit join operation and a partition operation. Also, in some embodiments, the set of properties include a function type for a function used in the operation specified by the command. Examples of function type include a data filtering function, a data format function, a data manipulation function, and a case sensitivity function.

The process 400 uses the instantiated schema and the property derivation framework to interpret each query at 420 to identify each query's semantic components and associated properties. To interpret the query, in some embodiments the raw query text is first parsed into its syntactical components, which may be represented by an abstract syntax tree. The parsed query is then bound to semantic components, by associating the syntactical components to the components of the property derivation framework. In some embodiments, the semantic components and query structure are represented in an algebraic query representation that is independent of any database syntax. The components of the query can then be identified by performing a semantic analysis on the algebraic representation. In some embodiments, at least some of the properties of each component can then be identified using (in part) the property derivation framework. Other properties can be identified by directly analyzing the components (e.g., by grouping them into types, etc.).

In the embodiments discussed above, the identification of the query components and/or properties is performed during a semantic analysis on the algebraic representation. In other embodiments, the components of the query are identified from the earlier stages of query interpretation than the semantic analysis, e.g. during parsing the raw query text into the abstract syntax tree, or during binding the abstract syntax to the algebraic representation. In some embodiments, these parsing and binding operations are performed by a Parser component and a Binder component of the DVS 337 (not shown), respectively. One advantage of identifying the components and/or properties upstream in these earlier stages is that there is less contextual information about the query that must be passed between them in order to do the semantic analysis downstream. The disadvantage in such embodiments, however, is that these earlier representations are not as expressive of the underlying query semantics.

The process 400 then determines at 425 whether the query can be fully supported by other candidate databases, or in some embodiments by a specifically selected candidate database. In some embodiments, this determination is performed by the Query Processor module 515 of the Database Inspector 500. In other words, the process 400 identifies a discrepancy between executing the query on the original database versus executing it on the candidate database. For example, certain components of the query may be associated with proprietary features of the original database (e.g., database operations performed by executing the query) and not supported by the candidate database. Examples of potentially unsupported features include updateable views, case sensitivity in columns, default values, and certain data types (e.g., periods). In addition, user-defined query components such as references to macros and stored procedures that are tailored to the original database would be incompatible and therefore not be recognized automatically by all candidate databases. If the process determines that the query cannot be fully supported, then the unsupported components are identified as such at 430, and the process 400 continues to 435.

Figure 5:
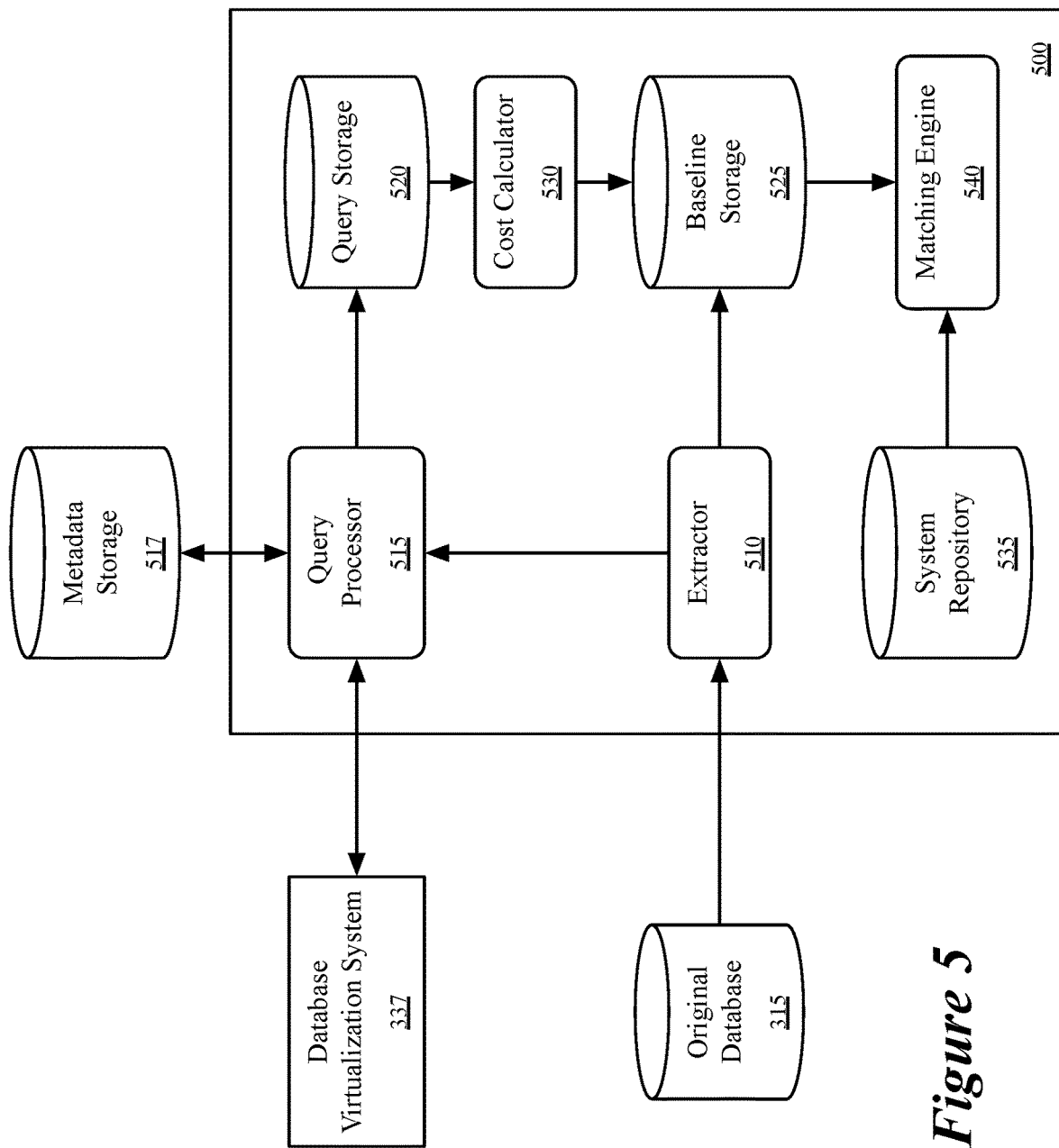
FIG. 5 conceptually illustrates the architecture of the Database Inspector.

In some embodiments, the Query Processor generates query metadata based on the identified discrepancy (e.g., the identified unsupported features or incompatible components), and stores the generated query metadata in a Metadata Storage 517. The Metadata Storage 517 may be a component of the Database Inspector 500 or, as shown in FIG. 5, may be an external storage accessible by the database recommendation and migration engine 300 and retrieved by other engine components, such as the Migration Verifier 340. In some embodiments, the generated metadata is specific to a candidate database selected by the user, and in other embodiments the generated metadata may be applicable to more than one candidate database.

The process 400 stores at 435 the identified query components and properties, and determines at 440 if there are additional queries to interpret. In some embodiments, the query components are stored in a Query Storage 520 of the Database Inspector 500. If there are additional queries, the process 400 returns to 420. If there are no more queries, the process 400 ends.

Figure 6:
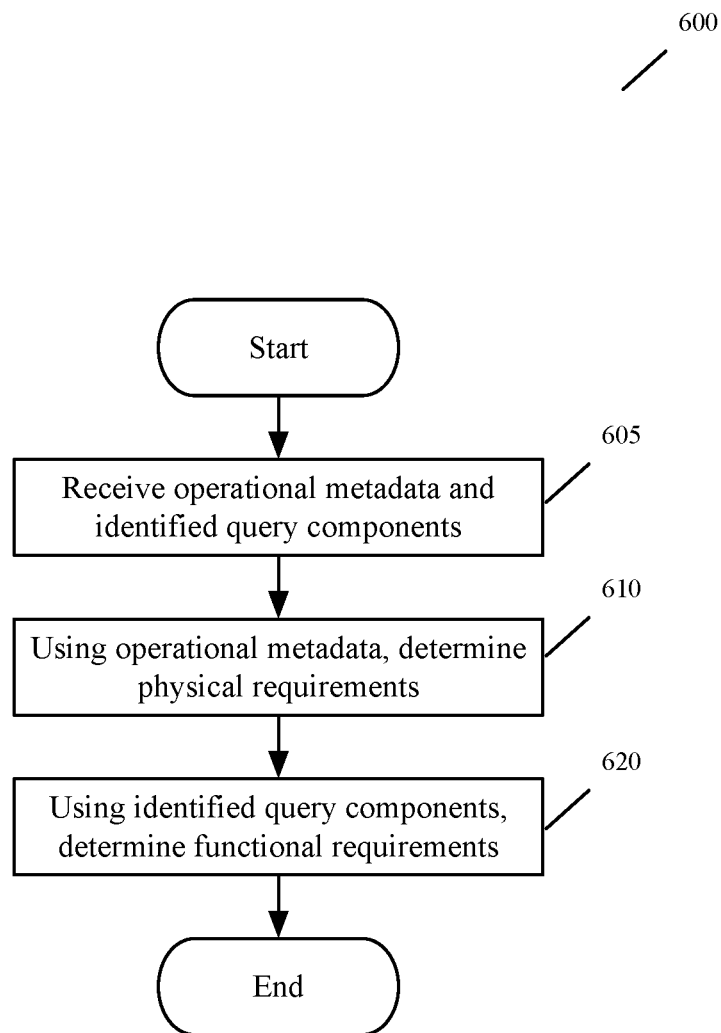
FIG. 6 describes a process for determining a baseline of the physical and functional requirements of the original database.

After inspecting the original database 315, the database recommendation and migration engine 300 defines a baseline of physical and functional requirements for performing the workload. FIG. 6 conceptually illustrates a process 600 for defining the baseline requirements. This process corresponds in some embodiments to operation 210 of process 200 described in FIG. 2 above. In some embodiments, part or all of this process is performed by the Database Inspector module 325 of the database recommendation and migration engine 300.

The process 600 begins at 605 by receiving the operational metadata and the identified query components. As noted above, the operational metadata is part of the database workload that was received from the original database, which in some embodiments was extracted by the Extractor module 510 of the Database Inspector 500. In some embodiments the operational metadata is stored in a Baseline Storage 525 of the Database Inspector 500. Further, the query components were identified during the inspection of the database workload, and in some embodiments are retrieved from the Query Storage 500.

The process 600 uses the operational metadata to determine at 610 the physical requirements of the workload. In some embodiments, the operational metadata includes physical information about a database workload (e.g., throughput, number and size of objects and tables, etc.). In order to be able to perform the workload, a candidate database must be able to meet these physical requirements to physically store the data, execute the queries, and support the throughput. In some embodiments, the baseline also includes price information.

The process 600 uses the identified query components to determine at 615 the functional requirements of the workload. In some embodiments, the functional requirements are determined using the aggregate identified components of all the interpreted queries in the original database workload, as described above by reference to process 400 in FIG. 4.

The functional requirements are determined in some embodiments by calculating a complexity score for each query in the workload. The complexity of a given query for the original database describes (e.g., quantifies) in some embodiments the level of difficulty to understand and rewrite the query for another database. In some such embodiments, the complexity further describes the difficulty to rewrite the query based on a particular target (e.g., candidate) database.

In addition, the complexity score alternatively or conjunctively describes in some embodiments the verifiability of the query after it has been emulated for a candidate system. The verifiability describes whether the results of executing the emulated query on the candidate database are the expected results compared to the results of executing the original query on the original database. For example, a query may execute on the candidate system without requiring a single change. In such a scenario, the complexity score of that query is not just the cost of rewriting it (which is in this case zero). If the query is a very complex query, then it must be analyzed to ensure that it produces the correct results, since just because it runs without modification does not mean that the query produces the correct results. In some embodiments, verifiability is the core concept for complexity within which rewrite-ability and understanding are contained, since if a query requires a lot of effort to rewrite, then it necessarily requires effort to verify. However, even if a query requires no effort to rewrite (as in the example just described), if the query is complex then it still requires effort to verify.

In some embodiments, the complexity score may alternatively or conjunctively include other factors than query understandability, rewrite-ability, and verifiability. For example, the complexity score may describe the resource-intensiveness of the query, e.g. the consumptive load that the query places on the database.

The complexity score can also be aggregated over queries in applications in some embodiments, to describe the level of difficulty in understanding and rewriting applications. The complexity score can also be aggregated over the entire database workload. Aggregate complexity scores are used in some embodiments as a proxy for database resources and cost required to support the database workload, and to assess the relative cost in resources, time, and money for migrating some of all of the workload.

In some embodiments, the complexity score is calculated by assigning a cost factor for each identified component or component properties of each interpreted query. In some such embodiments, each component type's cost factor is a weight value, and the query cost is computed as a weighted sum. In other embodiments, each component type's cost value is a normalizing cost score that is added with the other cost scores of the query's other component types through weight values. These cost values are specific in some embodiments only to the original database, whereas in other embodiments the cost values also dependent on both the original database and the candidate database. The aggregate cost of all queries is then used as a quantitative proxy for the functional requirements of the workload.

The cost values discussed above may be assigned in some embodiments based on components identified from the abstract syntax tree after parsing the query. In other embodiments, the cost values may be assigned based on components identified from the algebraic representation after binding the query. In some embodiments, the aggregate cost is computed by a Cost Calculator module 530 of the Database Inspector 500 and stored in the Baseline Storage 525. In other embodiments, these cost values are requested from and returned to the Database Inspector module by a database insight engine (e.g., Datometry QInsight). Further details of the database insight system can be found in U.S. patent application Ser. No. 16/599,049 filed on Oct. 10, 2019, titled "Quantifying Complexity Of A Database Query," which is incorporated herein by reference.

After determining both the operational (i.e., physical) requirements and the functional requirements of the original database workload, the process 600 ends.

Figure 7:
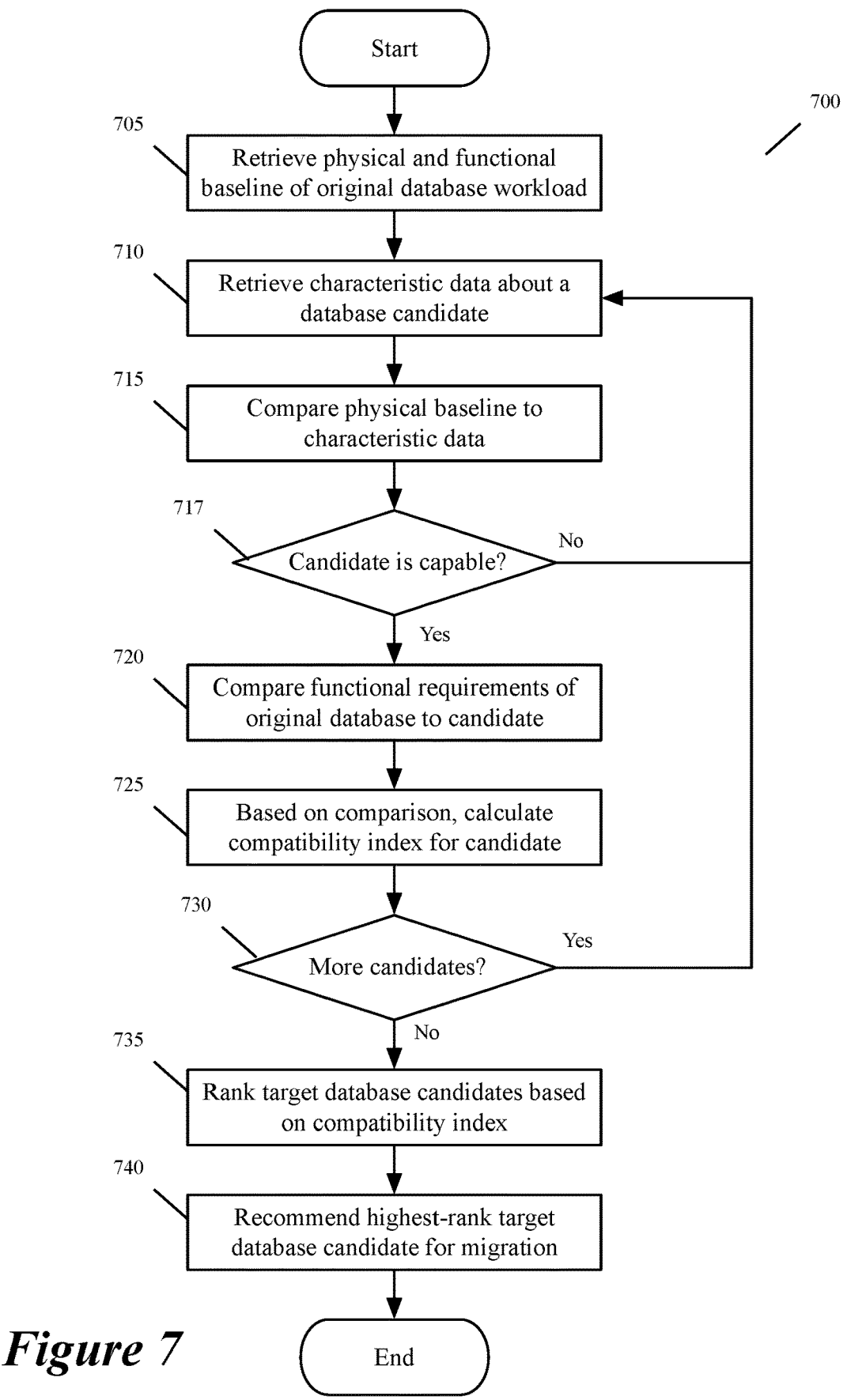
FIG. 7 describes a process for recommending candidate databases.

After defining the baseline of physical and functional requirements for performing the workload, the database recommendation and migration engine 300 recommends capable candidate databases. FIG. 7 conceptually illustrates a process 700 for recommending the candidate databases. This process corresponds in some embodiments to portions of operation 215 of process 200 described in FIG. 2 above. In some embodiments, part or all of this process is performed by the Database Inspector module 325 of the database recommendation and migration engine 300. The process 700 is here described by reference to FIG. 5, which conceptually illustrates the architecture of the Database Inspector 500 of some embodiments.

The process 700 begins by retrieving at 705 the physical and functional baselines of the original database's workload. In some embodiments, the physical and functional baselines are retrieved from the Baseline Storage 525 of the Database Inspector 500.

The process 700 retrieves at 710 characteristic data for an available candidate database. This data is curated and maintained on a per-candidate database system basis. In some embodiments, the characteristic data is stored in the System Repository 535 of the Database Inspector 500. The data in the System Repository 535 includes descriptions of the general physical limits of each available candidate database system, e.g. the maximum number of objects and tables, the maximum number of concurrent connections, the maximum data throughput, and the maximum amount of data that can be stored. Information specific to candidate database systems is also stored, such as units of scaling, host types, abstract units (e.g. Microsoft DWU) and sizes (e.g. Snowflake small, medium, and large).

The data in the System Repository 535 also includes benchmark data. These benchmarks include industry standards such as TPC-H and TPC-DS, custom proprietary benchmarks, and micro-benchmarks such as singleton operations per second. The data may also include pricing data that is scraped directly from the provider websites, explicitly instrumented to take price into account, or other means.

The process 700 compares at 715 the characteristic data for the candidate database with the baseline physical requirements. In some embodiments, the comparison is performed by a Matching Engine 540 of the Database Inspector 500. Based on the comparison, if the process determines at 717 that the candidate database is incapable of performing the original database workload, then the process returns to 710 to select a different candidate database.

If the process 700 determines at 717 that the candidate database is capable of performing the original database workload, then the process compares at 720 the functional baseline of the original database to the candidate database. In some embodiments the comparison is performed by the Matching Engine 540.

In some embodiments, the comparison of functional requirements is performed by using a template specific to each candidate database that describes its supported features. In some such embodiments, the template is compared to the query components and properties of the original database workload that were identified by the Database Inspector 500. In some such embodiments, a compatibility assessment of how many of the features and components of the workload are supported by the candidate database is performed based on the template. The assessment in some embodiments is automatically based on a threshold of supported features, or is based on a decision by the user as to whether the missing features, and correspondingly impacted queries or applications, are acceptable or not.

In some embodiments, the process 700 calculates at 725 a compatibility indicator to indicate the degree of compatibility of the candidate database. In some embodiments, the compatibility indicator is a level of compatibility, e.g. low, medium, and high. In some of these embodiments, the level is determined using threshold values for the difference in aggregate complexity of the workload between the original database and the candidate database.

In some embodiments, the compatibility indicator is a compatibility index that takes into account the relative functional compatibility of the original and candidate systems. In some embodiments, the index quantifies the difference in cost of migrating features of the original database to the candidate database. For example, in some embodiments, the matching engine represents the compatibility index as a percentage of how much of the original database's overall workload will run out-of-the-box after migration, and specify which applications or custom code will be incomplete. This gives the user the ability to see if a specific line of business is adversely affected or not.

In some embodiments, the calculation of compatibility index is performed by calculating (as described above by reference to operation 615) the aggregate complexity score of the identified components of all the queries in the original database's query workload (or all the queries for a specific application being investigated) using cost values tailored to the candidate database, and measuring the difference between the resulting candidate database aggregate complexity to the original database aggregate complexity.

The candidate database cost values may be different from the original database cost values, for example, if the original database supports features (e.g., proprietary features) that are not supported by the candidate database. In some such embodiments, the difference in complexity is reflected in different cost values for each component. In other such embodiments, the difference in cost is the difference of the cost of the identified unsupported components, as referred to above in operation 430 of process 400.

In some embodiments, the compatibility index is calculated just based on the features of the original database that are not supported by the candidate database. In some such embodiments, the compatibility index is calculated as a percentage. For example, in such embodiments, a candidate that is fully able to process the workload and support all features would have a compatibility index of 100%. A candidate that is unable to perform even a single query from the workload would have a compatibility index of 0%. If the compatibility index is less than 100%, the database user still has the option to perform the database migration. The matching engine 540 in some embodiments can identify and emulate specific statements and applications that are the reason for the discrepancy, using the database virtualization system 337 to emulate the missing features and functionality on which these problematic statements and applications depend. This comes with the cost of additional overhead since part of the application must be executed inside the system instead of being executed by the database. The system provides guidance on what are the features that need to be emulated and their expected additional overhead. Another solution in some embodiments is to manually rewrite the problematic statements or applications. The engine produces a rewrite effort estimate in such embodiments to help the user make this decision.

In some embodiments, the Database Inspector 500 may perform empirical testing. For example, it may run either canned benchmark data or a sample of the actual workload from the original database on each candidate database to assess performance. The results of these empirical tests may also be used by the matching engine 520 to refine the functional comparison and be incorporated into the compatibility index.

The process 700 determines at 730 whether there are additional capable candidates. If the process determines that there are additional capable candidates, then the process 700 returns to 710 to perform the analysis on another capable candidate database.

If the process determines at 730 that there are no more capable candidate databases, then the process ranks the capable candidates at 735 in order of their compatibility index. In some embodiments, the process ranks the database candidates in a feature space. For example, the matching engine 520 could rank the candidate systems in a multi-dimensional space of compatibility index vs. anticipated cost, e.g. financial cost or the cost of manually changing the features used by the application to be compatible with the new target system. Alternatively, in some embodiments the matching engine 520 could calculate a "distance" from the original database system to each candidate system based on the disparity in their functional capabilities (in some embodiments, represented by a disparity in compatibility index). Candidate database systems with less disparity would have smaller distance from the original database system, and therefore would be preferable to those with greater distances.

In some embodiments the ranked list of candidates is presented on the user interface 310. The process 700 automatically recommends at 740 the candidate database with the highest ranked compatibility index for migration in some embodiments. The process 700 then ends. In some embodiments the recommended database is automatically selected and the migration process begins automatically, whereas in other embodiments the user must select a candidate to continue. However, in such embodiments, the user may select any capable candidate instead of the recommended candidate database for migration, even if it has a lower compatibility index.

In some embodiments, the recommended database candidate is a different database type than the original database. However, in some embodiments the candidate database may be the same type as the original database. For example, the original database may not be fully optimized, or may have too much operational and functional capability. By performing the migration analysis, a less-functional version of the database type may be chosen which has fewer features and therefore less cost and better performance.

After recommending a candidate database, the database recommendation and migration engine 300 provisions the candidate database, migrates the data and the schema, and evaluates the migration, as discussed above by reference to FIG. 2.

Figure 8:
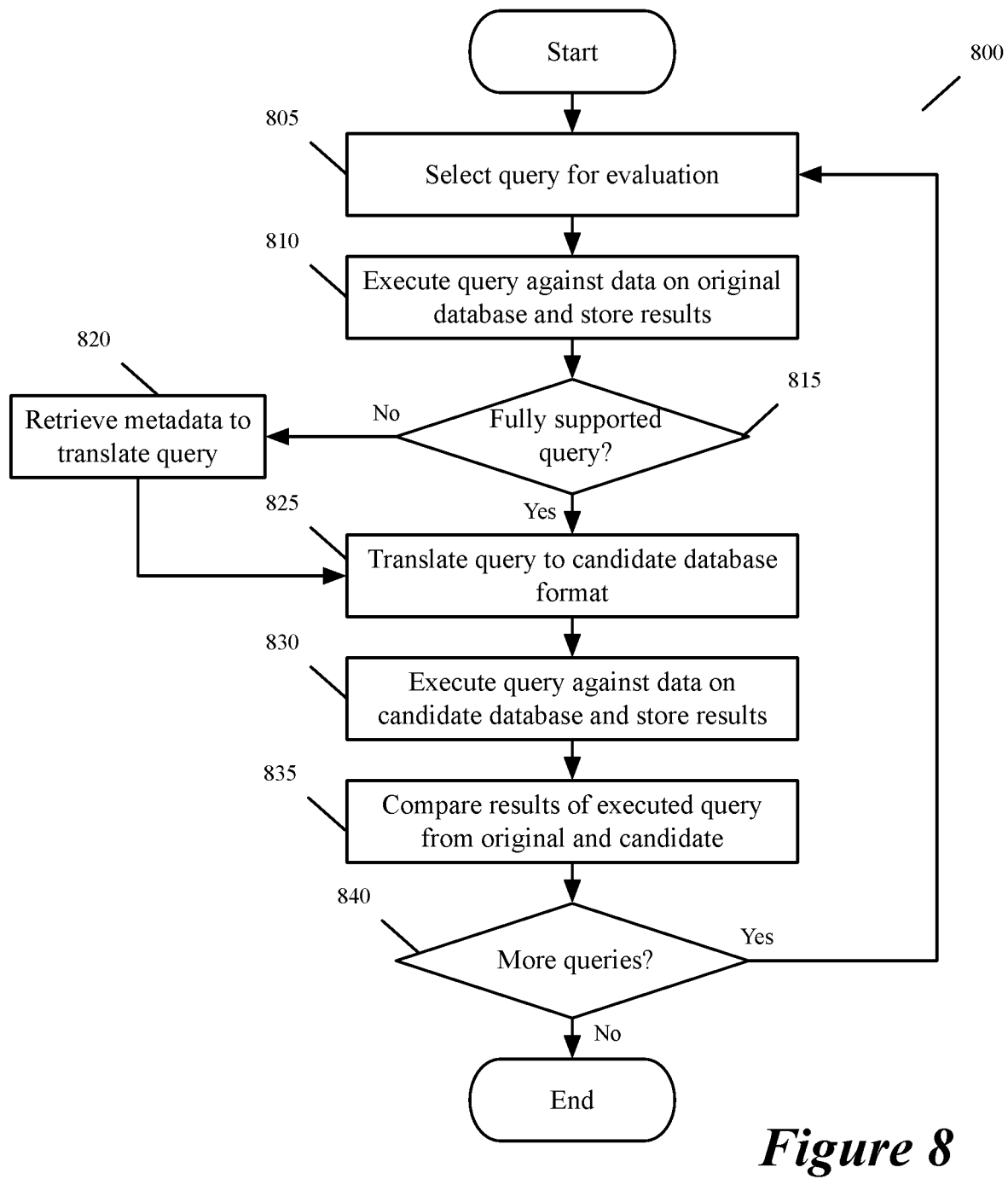
FIG. 8 describes a process for evaluating a candidate database after migration.

FIG. 8 conceptually illustrates a process 800 for evaluation of the migration to the candidate database. This process corresponds in some embodiments to portions of operation 230 of process 200 described in FIG. 2 above. In some embodiments, part or all of this process is performed by the Migration Verifier module 340 of the database recommendation and migration engine 300. In some embodiments, the migration is verified by performing side-by-side analyses of identical queries against both the original 315 and provisioned candidate 320 databases in parallel, and comparing the results. In some embodiments, some of the queries used for evaluation are the extracted and pre-processed query logs from the database workload, as described by reference to FIG. 4 above. In other embodiments, some of the queries used for evaluation are benchmark queries or other canned sets of queries. Different sessions of queries may be processed by different instances of process 800 in parallel.

The process 800 begins at 805 by selecting a query for evaluation in parallel against the original and the provisioned candidate databases. In some embodiments, the selected query is retrieved from the Query Storage 520 of the Database Inspector 500.

The process 800 executes at 810 the selected query against the original database 315. In some embodiments, the process 800 does not execute the query directly against the original database, but instead executes it via the database virtualization system (DVS) 337 (as conceptually illustrated by the dashed line in FIG. 1). The result of executing the query is stored, in either a local or a remote storage, for later use by the process.

The process 800 determines at 815 whether the query is fully supported by the candidate database. In some embodiments, the determination is based on the identified components during the database inspection, as described by reference to FIG. 4. The components are evaluated against a features template for the candidate database to see if all the components are supported or not.

If the process determines that the query is not fully supported, then the process retrieves at 820 a set of query metadata from the Metadata Storage 517 associated with the unsupported features of the query (in other words, a discrepancy between features or operations of the original database and the candidate database). In other embodiments, the query metadata is generated at run time by the process 800. The query metadata is then used to translate the query at 825 to a format that can be executed on the candidate database.

In some embodiments, the query is executed on both the original database and the candidate database via the database virtualization system 337. In such embodiments, the query is parsed and translated to a database-independent format, and then the query is translated from that independent format to the specific formats for the original database and the candidate database. In some embodiments the database independent format is the algebraic representation of the query. In such embodiments, the discrepancy between the original database and the candidate database is expressed as a difference in the algebraic representation. In some embodiments, if the query is not fully supported by the candidate database, then the retrieved metadata is used to supplement the algebraic representation, as a run-time workaround, so that the query can be translated to the candidate database syntax. The amount of extra algebraic representation (e.g., the "bloat") that is required in the algebraic representation is in some embodiments a measure of the discrepancy between the original database and the candidate database.

The process 800 executes the translated query against the candidate database at 830 and stores the results, for example in the same format or representation as the results from executing the query on the original database. The results from both queries are then compared at 835, to evaluate whether the results from the candidate database are correct, using the results from the original database as a gold standard in some embodiments. In some embodiments, the results of the comparison are presented on the user interface 310. These results may be shown as an aggregate result or may be shown on a query by query basis, or application by application basis.

The process 800 determines at 840 if there are any additional queries to evaluate. If there are additional queries the process returns to 805. If there are no further queries, the process 800 ends. After the evaluation period is complete, then the user may make a final decision regarding whether to accept the migration and redirect the client applications to the new candidate database, or to roll back the migration and select a different candidate, as referenced by operations 235-240 in FIG. 2.

Figure 9A:
FIGS. 9A-C conceptually illustrate an example of the user interface.
Figure 9A:
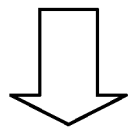
Figure 9A:
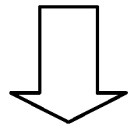
Figure 9B:
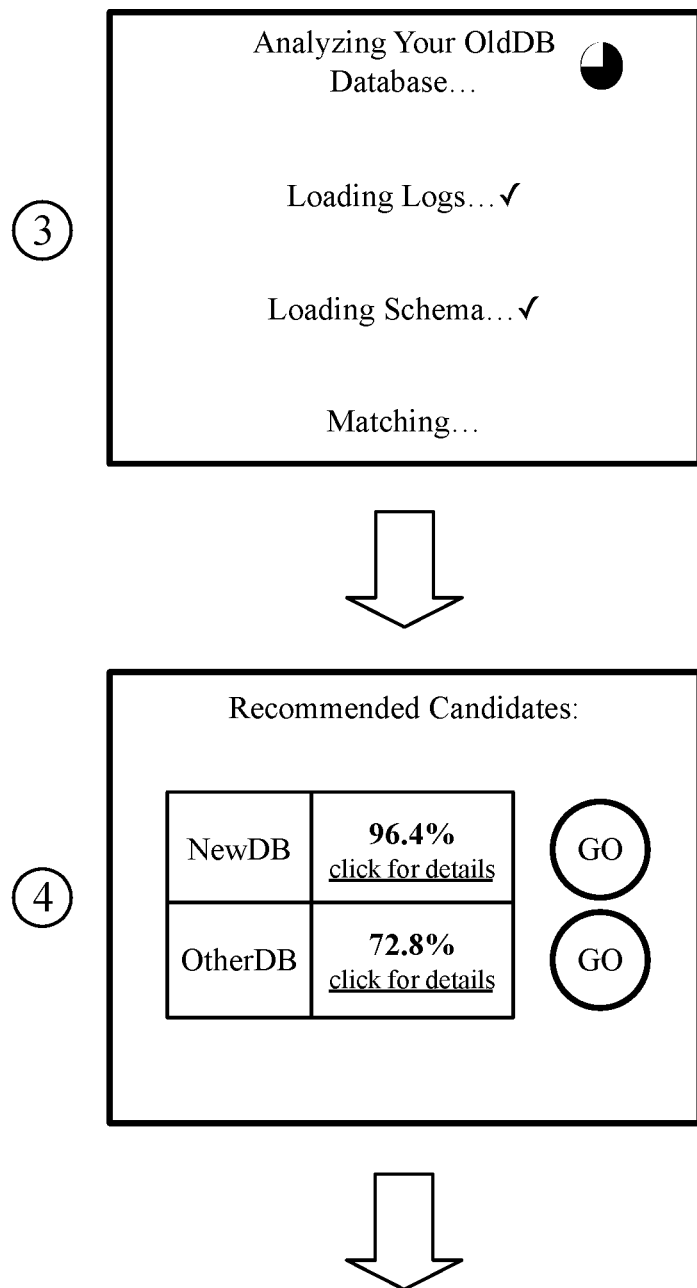
Figure 9C:
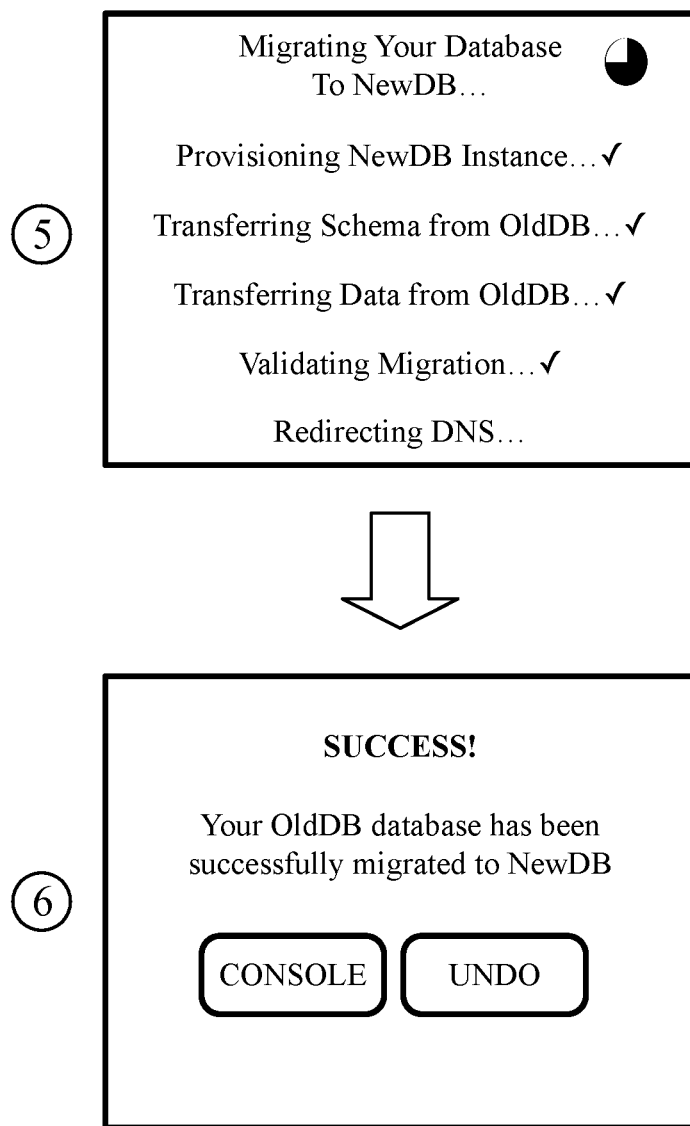

As noted above, the database recommendation and migration engine includes a Migration Manager 305 in some embodiments that provides a user interface 310 for initiating the migration process and providing feedback of its progress. The user interface 310 may be a stand-alone service or may be integrated into the cloud service provider's console. FIGS. 9A-C conceptually illustrate an example of the user interface in some embodiments.

In the first panel (indicated by the circled number "1") illustrated in FIG. 9A, the user interface shows a default console view in some embodiments of the user's database. The console has a dashboard that shows various operating parameters of the database in various graphical and list formats. For example, the original database could be an Oracle database, hosted on Amazon Web Services (AWS). However, the original database could also be located in an on-premises site. In this case, the database recommendation and migration engine's user interface is directly integrated into the cloud provider's console. As seen in the first panel, this integration results in a prompt for the user to find a better home for their database.

If the user decides to click the prompt, then in some embodiments the user interface presents the second panel illustrated in FIG. 9A (indicated by the circled number "2"). This panel asks the user to provide a location (e.g., an Internet Protocol address or Uniform Resource Locator) of the original database. In some embodiments, the panel also asks for administrative credentials. This information allows the Database Inspector 325 to issue queries against the original database for retrieving logs, schema, and system parameters for analysis. The user is provided a control (e.g., a "Submit" button) to send the information to the Database Inspector 325.

In some embodiments (not shown), the panel also provides a selection for specific applications. The user may select the applications from a drop down or list, or in some embodiments there may be a sliding bar, where time and resources needed to perform the automatic migration would increase by adding more applications to the scope.

After submitting the information, the user interface presents the third panel illustrated in FIG. 9B in some embodiments (indicated by the circled number "3"). This panel is a status panel that informs the user of the progress of the Database Inspector 325 operations. A progress indicator as well as text status messages are used to provide the status in real-time. In some embodiments, this panel is updated by the Migration Monitor 350.

Once the Database Inspector 325 analysis is complete, the user interface presents the fourth panel illustrated in FIG. 9B in some embodiments (indicated by the circled number "4"). In the panel, the user interface then presents the user with a functional assessment of the current system, and recommendations for the candidate migration system. The functional assessment may include a metric such as a compatibility index (for example, represented as a percentage) for each candidate database, and provide a link for more detailed results of the analysis. In some embodiments, the recommended candidate databases are provided in a ranked order based on the compatibility index. The user interface also presents the user with control items to select/confirm a candidate system and begin the migration process. The user can also select a different candidate database than those that are recommended (not shown).

Upon initiating the migration process, the Database Provisioning module 330 provisions the selected candidate database and the Content Transfer module 335 transfers the schema and data as described above. In some embodiments, the Migration Monitor 350 updates the user interface as shown in the fifth panel illustrated in FIG. 9C (as indicated by the circled number "5") to provide detailed reporting to the user during these operations, including any errors (not shown). After the migration is complete, in some embodiments the user interface provides a summary report (not shown) from the Migration Verifier 340 with the result of the migration process and validation testing.

In some embodiments, as shown in the fifth panel, the DNS redirection to redirect traffic from the client application to the new candidate database by the Nameserver Switcher 345 is also performed automatically. In other embodiments, the user interface provides another control item (not shown) to the user to begin using the new candidate database in place of the original database, which will trigger the Nameserver Switcher 345. The user could also schedule the cut-over to occur at a certain date and time in order to minimize potential disruption and allow more time to make preparations, inform users and employees, etc.

After the migration has completed, in some embodiments the user interface presents the sixth panel illustrated in FIG. 9C (as indicated by the circled number "6"). This panel informs the user of success or failure of the migration. In the case of failure (not shown), in some embodiments the migration is automatically rolled back and the panel informs the user when the database is restored to its previous state. In the case of success, the panel provides the user an option to undo the migration, or to proceed to the database console for the new candidate system, which will be an updated version of the first panel indicating the new candidate database on the backend.

As discussed above, the functional assessment may include calculating a compatibility index for each candidate database, that expresses the feasibility of replacing the original database with the candidate database. The compatibility index is computed in some embodiments by the Database Inspector 325, and some such embodiments represent the compatibility as a percentage.

In some embodiments, as discussed above by reference to FIG. 6, the compatibility index is at least partially based on aggregated complexity scores of the queries from the original database. In some embodiments, the compatibility index is calculated by the Database Inspector 325 from an aggregate complexity score computed over a set of queries. The set of queries may be all the queries in the workload, or a subset of queries from individual applications, clients, or users, over a particular period of time.

The aggregate complexity score represents the level of difficulty in understanding the set of queries, rewriting the set of queries for another database, and verifying the results of the rewritten set of queries in the workload when executed on the other database after migration. In some embodiments, the aggregate complexity score is the sum of individual complexity scores computed for individual queries in the workload, as further described below.

The database workload in some embodiments is extracted from the database log. The database workload in some embodiments includes all queries executed on the database as well as the database schema and operational metadata generated by the original database (e.g., during query execution). In some embodiments, the database log is extracted from the original database, as described above by reference to FIG. 4. Some embodiments extract the workload by generating a tailored extraction script based on the information provided through the user interface. The provided information includes in some embodiments filtering information, such as specific applications, users, and clients, or particular periods of time.

U.S. patent application Ser. No. 16/599,049 describes computing aggregated complexity scores for a database workload, and is incorporated herein by reference. As described in U.S. patent application Ser. No. 16/599,049, some embodiments compute the aggregate complexity score only over unique queries of the workload, since including duplicate queries results in an inflation of the aggregate complexity score. Duplicate queries are identified in some such embodiments using query identifiers, which are either associated with each query in the extracted workload, or generated directly while processing the query itself. For example, some embodiments generate the query identifier by calculating a hash value from the semantic structure of the query (e.g., the algebraic representation of the query) or from the syntax of the query (e.g., from the raw query text). Queries that are identified as duplicates are removed from the extracted log before computing the aggregate complexity score.

Further, in some embodiments, the queries in the extracted workload are also reorganized into individual sessions. Some such embodiments reorganize queries into sessions based on a session identifier from the log. Queries in each session are processed in some embodiments one at a time, in the order that they were originally executed in the log, in order to avoid errors from referencing temporary objects that are unique to particular sessions. Each session is processed in parallel, as well as achieve a time acceleration factor in processing the queries relative to real-time to compute the aggregate complexity score.

As noted above, the aggregate complexity score is computed over a set of queries from the original database workload, with the aggregate complexity score being a summation of individual complexity scores of the unique queries in the set. The complexity of a given query represents in some embodiments the understandability of the query by a human or a machine, such as understanding what the query does, what its components are, etc. The complexity score for a query further describes in some embodiments how difficult it is to rewrite the query to have the same result, when executed on or submitted to a different database than its original database (for which the query was natively intended to run prior to rewriting). The complexity scores also describe in some embodiments the verifiability of the query's results, if the query is rewritten and executed on a candidate database, in comparison to the results of executing the query on the original database.

The complexity score is determined in some embodiments by analyzing each query from the database workload individually, interpreting each query to identify query attributes, query components, and properties of the query components, as discussed above by reference to FIG. 4. The complexity scores are calculated based on complexity values associated with the components, properties of those components, and other patterns within the queries. In some embodiments, the set of properties include a grouping of the components according to a set of component types and a number of each component type in the database query. The number for each component type is used in some embodiments to calculate the complexity score for the query.

In some embodiments, each component type has a cost value associated with it and the complexity score for a query is computed by using the cost values of its identified component types. These cost values are in some embodiments predetermined and stored (e.g., in a lookup table). In some embodiments, the complexity score is computed as a weighted sum. In some of these embodiments, each component type's cost value is a weight value. In other embodiments, each component type's cost value is a normalizing cost score that is added with the other cost scores of the query's other component types through weight values.

In some embodiments, the complexity score for each query is an inherent complexity score which only depends on the database for which the query is written. The cost values are only dependent on the database which executes the query. The inherent complexity score of a given query is computed twice, once by looking up cost values of the query components for the original database, and again by looking up cost values of the query components for the candidate database. The complexity for rewriting the query for the candidate database is then expressed as the difference between the two inherent complexity scores. In some such embodiments, the complexity scores are computed from the database independent format of the query (e.g., the algebraic representation), as described by reference to FIG. 6 above. Cost values for query components for different database types may be stored in different lookup tables in some embodiments or stored in the same lookup table in other embodiments.

In other embodiments, the complexity score for each query is a relative complexity which expresses the complexity of rewriting the query in a form that is for the original database to a form that is for a candidate database. Under this approach, relative complexity scores vary based on the target database candidate under consideration for migration.

The query-component cost values are accordingly dependent on the choice of both the original database and candidate database. In some of these embodiments, the complexity score is computed only once, by looking up the cost values for each component of a query in a single lookup table that is for a specific combination of original database and candidate database. Cost values for query components for different combinations of original and candidate database types in some embodiments are stored in different lookup tables in some embodiments or stored in the same lookup table in other embodiments. These differing costing schemes are further described in the above-incorporated U.S. patent application Ser. No. 16/599,049.

In some embodiments, the aggregate complexity scores are used to generate a workload insight report to inform the user decision to re-platform the database. This workload insight report provides insight into which applications are most essential, and how difficult (e.g., in terms of time or cost) the migration process will be for each application. Such a workload insight report is in some embodiments provided to the user for each candidate database, by selecting the "click for details" link illustrated in the fourth panel of FIG. 9B.

The workload insight report in some embodiments includes basic statistics about the number of applications and unique queries or statements. In some embodiments, the workload insight report also includes physical information about the database schema, such as the number of database objects (e.g. tables, views, macros, stored procedures) and schemas and the total size of the database. This information allows the user to assess the physical requirements of their workload and to prioritize migration of the largest database objects. For example, the user could then use this information to break the migration into phases. Furthermore, the workload insight report also includes in some embodiments an assessment of data that is rarely used, and which can be migrated to a cheaper and slower database system, rather than a more expensive system with the necessary speed for more heavily used data.

In some embodiments, the workload insight report includes a ranking of applications based on complexity and/or migration feasibility. The workload insight report also includes in some such embodiments an assessment of which applications have the simplest workloads for migration and can be migrated more easily in a phased approach or identify applications that are complex but are not heavily used and can therefore be retired rather than migrated.

The workload insight report includes in some embodiments a comparison of each application's complexity and its statement volume. Some apps may have low complexity and high statement volume, whereas others may have low statement volume and high complexity. In some embodiments, the report also includes a list of complex features. Complex features include samples, recursive calls, uppercase columns, merges, and date functions. Further details of the workload insight report can be found in the above-incorporated U.S. patent application Ser. No. 16/599,049.

Figure 10:
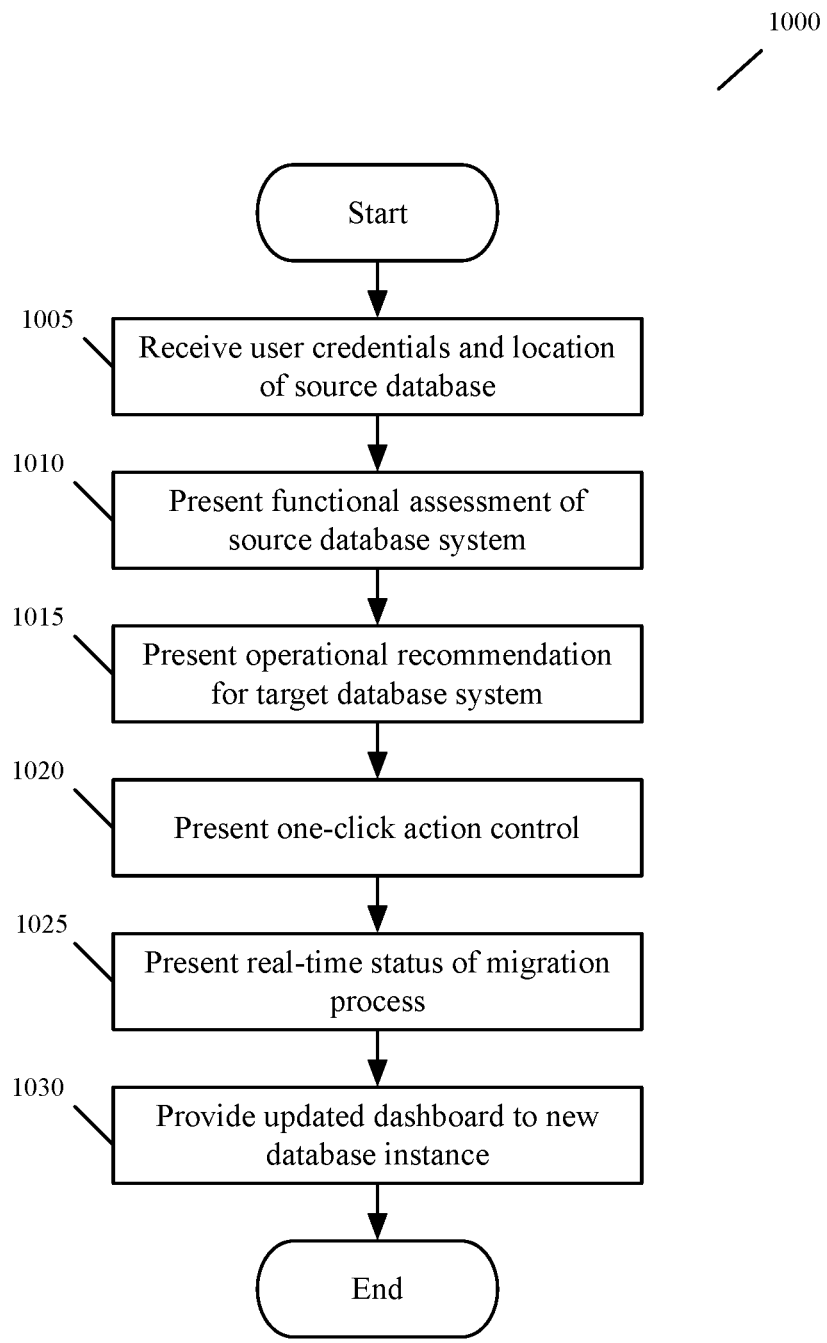
FIG. 10 describes a process performed by the Migration Manager for presenting a user interface for one-click database migration.

In some embodiments, the user interface provides a single "one-click" user interface control to perform all of the above data migration processes in fully automated fashion. A process 1000 for presenting a user interface for one-click database migration in some embodiments is described in FIG. 10, which is performed in some embodiments by the Migration Manager 305. An accompanying example of a user interface for one-click database migration that is integrated into the cloud provider's database console is conceptually illustrated in FIG. 11.

The process 1000 begins by receiving at 1005 the user's administrative credentials for managing the original database. In some embodiments where the original database is hosted separately from the cloud provider that will host the candidate database, the process 1000 also receives the location of the original database (e.g. an Internet Protocol address or Uniform Resource Locator). In other embodiments where the original database is also hosted with the cloud provider, the user interface presents a unified console for administration of the original database after receiving the user credentials.

After receiving the user credentials, the process 1000 presents at 1010 a functional assessment of the original database system. The process 1000 also presents at 1015 an operational recommendation for a suitable candidate database. This recommendation is based on matching the functional assessment of the original database with profiles of the supported candidate database systems offered by the cloud provider. In the one-click database migration scenario, the functional assessment and the operational recommendation are automatically initiated by the Database Inspector 325 upon providing the credentials and are presented in an integrated fashion into the cloud console, as illustrated in FIG. 11.

The process 1000 then provides at 1020 a single action control item to the user. For example, in some embodiments the control item is a big, possibly green, button marked "Go" in the user interface, as illustrated in FIG. 11. Clicking (e.g., with a mouse) or pressing (e.g., on a touchscreen) this button initiates provisioning of the candidate database, migrating the data and the schema, validating the migration, and implementing the DNS cut-over without any further user interaction.

Figure 11:
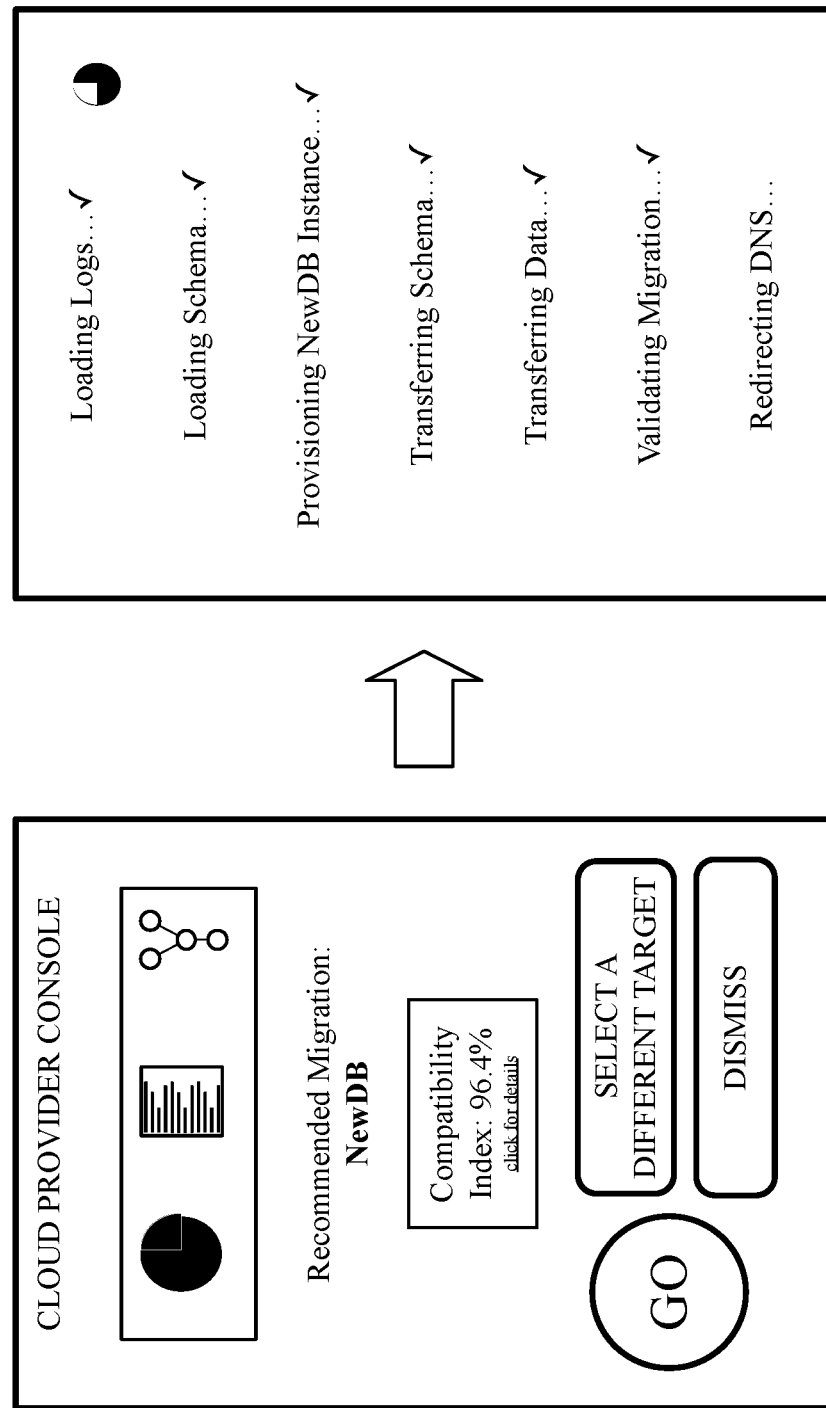
FIG. 11 conceptually illustrates an example of a user interface for one-click database migration.

After initiating the one-click database migration, in some embodiments the process 1000 presents at 1025 real-time updates of the progress during the migration, as illustrated in FIG. 11. These updates may include status updates from the Database Provisioning module 330, the Content Transfer module 335, the Migration Verifier 340, and the Nameserver Switcher 345.

After the one-click database migration has completed, the process 1000 updates the user interface at 1030 to indicate completion and again displays the database console, which is now updated to reflect administration for the new candidate database system. The process 1000 then ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 12 conceptually illustrates an electronic system 1200 with which some embodiments of the invention are implemented. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random-access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described by reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for migrating a set of data objects from a first database of a first database type to a second database of a second database type, the method comprising:
retrieving a particular set of data from the first database;
performing an automated process to analyze the particular set of data and, based on the analysis, select the second database type from a plurality of other database types, wherein performing the automated process comprises generating and storing metadata for each query, in a log of database queries, that is supported by the first database type and not supported by the second database type;
presenting on a display (i) the selected second database type and (ii) a user interface control for migrating the set of data objects stored in the first database to the second database of the second database type;
in response to a selection of the user interface control:
provisioning the second database; and
transferring the set of data objects from the first database to the second database;
redirecting new queries written for the first database to the provisioned second database, wherein the new queries are in a first database syntax associated with the first database type; and
translating the new queries to a second database syntax associated with the second database type.

2. The method of claim 1, wherein performing the automated process to analyze the particular set of data comprises computing a compatibility score for each other database type, wherein each compatibility score quantifies an ease of migrating the set of data objects from the first database to a database of each other database type.

3. The method of claim 2, wherein the selected second database type has the highest compatibility score.

4. A method of for migrating a set of data objects from a first database of a first database type to a second database of a second database type, the method comprising:
retrieving a particular set of data from the first database;
performing an automated process to analyze the particular set of data and based on the analysis select the second database type from a plurality of other database types, wherein performing the automated process comprises computing a compatibility score for each other database type, wherein each compatibility score quantifies an ease of migrating the set of data objects from the first database to a database of each other database type,
wherein the particular set of data comprises a log of database queries that were performed on the first database during a time interval, wherein computing the compatibility score for each other database type comprises:
performing a query interpretation operation on each query in the log to identify a set of query components;
based on sets of cost values associated with the identified query components of each query, calculating an aggregate cost of the queries in the log for each other database type; and
computing the compatibility scores based on the aggregate cost of the queries for each other database type;
presenting on a display (i) the selected second database type and (ii) a user interface control for migrating the set of data objects stored in the first database to the second database of the second database type; and
in response to a selection of the user interface control:
provisioning the second database; and
transferring the set of data objects from the first database to the second database.

5. The method of claim 4, wherein
the sets of cost values comprise a particular set of cost values associated with the first database type and a plurality of sets of cost values associated with each other database type,
calculating an aggregate cost of the queries in the log for each other database type comprises calculating a first aggregate cost based on the particular set of cost values and a second aggregate cost for each other database type based on the set of cost values associated with each other database type, and
computing the compatibility score for each other database type comprises computing the compatibility score based on a difference between the first aggregate cost and the second aggregate cost.

6. The method of claim 5, wherein a subset of the identified query components are not supported by the second database type, wherein the difference between the first aggregate cost and the second aggregate cost is the difference in cost values of the subset of identified query components.

7. The method of claim 4, wherein the cost values associated with the identified query components of each query are based on the first database type and each other database type, wherein computing the compatibility score for each other database type comprises computing the compatibility score based on the cost values associated with both the first database type and the other database type.

8. The method of claim 4, wherein the query interpretation operation comprises pre-processing the log of database queries to reconstruct each query from a plurality of tables and a plurality of rows.

9. The method of claim 4, wherein the query interpretation operation comprises pre-processing the log of database queries to remove duplicate queries.

10. The method of claim 4, wherein the query interpretation operation comprises pre-processing the log of database queries to reorganize the queries into two or more sessions, wherein each session comprises queries that reference temporary database objects that are not referenced by queries in another session, wherein performing a query interpretation operation on each query comprises performing a plurality of query interpretation operations on queries in different sessions simultaneously.

11. The method of claim 4 further comprising redirecting new queries written for the first database to the provisioned second database.

12. The method of claim 11, wherein the new queries are in a first database syntax associated with the first database type, the method further comprising translating the new queries to a second database syntax associated with the second database type.

13. The method of claim 1, wherein translating the new queries from the first syntax to the second syntax comprises retrieving and using the generated metadata.

14. A method for migrating a set of data objects from a first database of a first database type to a second database of a second database type, the method comprising:
retrieving a particular set of data from the first database;
performing an automated process to analyze the particular set of data and based on the analysis select the second database type from a plurality of other database types;
presenting on a display (i) the selected second database type and (ii) a user interface control for migrating the set of data objects stored in the first database to the second database of the second database type;
in response to a selection of the user interface control:
provisioning the second database; and
transferring the set of data objects from the first database to the second database;
redirecting new queries written for the first database to the provisioned second database, wherein the new queries are in a first database syntax associated with the first database type; and
translating the new queries to a second database syntax associated with the second database type,
wherein redirecting new queries comprises configuring a Domain Name Service (DNS) to redirect the new queries to a database virtualization system (DVS), wherein translating the new queries further comprises using the DVS to translate the new queries.

15. The method of claim 1, wherein the particular set of data further comprises (i) a schema describing the set of data objects stored in the first database, and (ii) a set of operational metadata generated during execution of the database queries on the first database.

16. A non-transitory machine readable medium storing a program which when executed by at least one processing unit migrates a set of data objects from a first database of a first database type to a second database of a second database type, the program comprising sets of instructions for:
retrieving a particular set of data from the first database;
performing an automated process to analyze the particular set of data, and based on the analysis select the second database type from a plurality of other database types, wherein performing the automated process comprises generating and storing metadata for each query, in a log of database queries, that is supported by the first database type and not supported by the second database type;
presenting on a display (i) the selected second database type and (ii) a user interface control for migrating the set of data objects stored in the first database to the second database of the second database type; and
in response to a selection of the user interface control:
provisioning the second database; and
transferring the set of data objects from the first database to the second database;
redirecting new queries written for the first database to the provisioned second database, wherein the new queries are in a first database syntax associated with the first database type; and
translating the new queries to a second database syntax associated with the second database type.

17. The non-transitory machine readable medium of claim 16, wherein the set of instructions for performing the automated process to analyze the particular set of data comprises a set of instructions for computing a compatibility score for each other database type, wherein each compatibility score quantifies an ease of migrating the set of data objects from the first database to a database of each other database type, wherein the selected second database type has the highest compatibility score.

18. A non-transitory machine readable medium storing a program which when executed by at least one processing unit migrates a set of data objects from a first database of a first database type to a second database of a second database type, the program comprising sets of instructions for:
retrieving a particular set of data from the first database;
performing an automated process to analyze the particular set of data and based on the analysis select the second database type from a plurality of other database types, wherein performing the automated process comprises computing a compatibility score for each other database type, wherein each compatibility score quantifies an ease of migrating the set of data objects from the first database to a database of each other database type, wherein the selected second database type has the highest compatibility score;
presenting on a display (i) the selected second database type and (ii) a user interface control for migrating the set of data objects stored in the first database to the second database of the second database type; and
in response to a selection of the user interface control:
provisioning the second database; and
transferring the set of data objects from the first database to the second database,
wherein the particular set of data comprises a log of database queries that were performed on the first database during a time interval, wherein computing the compatibility score for each other database type comprises sets of instructions for:
performing a query interpretation operation on each query in the log to identify a set of query components;
based on sets of cost values associated with the identified query components of each query, calculating an aggregate cost of the queries in the log for each other database type; and
computing the compatibility score based on the aggregate cost of the queries for each other database type.

19. A non-transitory machine readable medium storing a program which when executed by at least one processing unit migrates a set of data objects from a first database of a first database type to a second database of a second database type, the program comprising sets of instructions for:
retrieving a particular set of data from the first database;
performing an automated process to analyze the particular set of data and based on the analysis select the second database type from a plurality of other database types;
presenting on a display (i) the selected second database type and (ii) a user interface control for migrating the set of data objects stored in the first database to the second database of the second database type; and
in response to a selection of the user interface control:
provisioning the second database; and
transferring the set of data objects from the first database to the second database; and
redirecting new queries written for the first database to the provisioned second database, wherein redirecting new queries comprises configuring a Domain Name Service (DNS) to redirect the new queries to a database virtualization system (DVS) to translate the new queries from a first database syntax associated with the first database type to a second database syntax associated with the second database type.

\* \* \* \* \*